US009660229B2

(12) United States Patent
Chellew et al.

(10) Patent No.: US 9,660,229 B2
(45) Date of Patent: May 23, 2017

(54) BATTERY PACK RELEASE WITH TACTILE FEEDBACK FOR CORDLESS POWER TOOLS

(75) Inventors: Justin Terrance Chellew, Lebanon, NJ (US); Roger B. Davis, Clinton, NJ (US)

(73) Assignee: Ingersoll-Rand Company, Davidson, NC (US)

( * ) Notice: Subject to any disclaimer, the term of this patent is extended or adjusted under 35 U.S.C. 154(b) by 352 days.

(21) Appl. No.: 14/235,480

(22) PCT Filed: Aug. 1, 2011

(86) PCT No.: PCT/US2011/048072
§ 371 (c)(1),
(2), (4) Date: Jan. 28, 2014

(87) PCT Pub. No.: WO2013/019202
PCT Pub. Date: Feb. 7, 2013

(65) Prior Publication Data
US 2014/0161513 A1 Jun. 12, 2014

(51) Int. Cl.
*B25G 3/18* (2006.01)
*F16B 21/00* (2006.01)
(Continued)

(52) U.S. Cl.
CPC ............... *H01M 2/10* (2013.01); *B23B 45/02* (2013.01); *B25F 5/00* (2013.01); *B25F 5/02* (2013.01);
(Continued)

(58) Field of Classification Search
CPC .... A47F 5/0823; A47F 5/0815; A47F 5/0807; B25F 5/02; B25B 21/00; H01M 2/10;
(Continued)

(56) References Cited

U.S. PATENT DOCUMENTS 2,501,497 A 3/1950 Clark et al.
2,658,972 A 11/1953 Brown
(Continued)

FOREIGN PATENT DOCUMENTS

CN 1126003 A 7/1996
DE 19933015 A1 5/2000
(Continued)

OTHER PUBLICATIONS

International Search Report for corresponding PCT Application No. PCT/US2011/046072, Date of mailing May 29, 2012.
(Continued)

*Primary Examiner* — Gregory Binda
*Assistant Examiner* — Nahid Amiri
(74) *Attorney, Agent, or Firm* — Sunstone IP

(57) ABSTRACT

Battery packs include a battery pack housing, at least one battery release member held by the battery housing, a (blind) latch held by the battery pack housing in communication with the battery release member that releaseably locks the battery pack to a device, and a tactile feedback mechanism that is held by the battery pack housing and is in communication with the battery release member. The tactile feedback mechanism generates a tactile feedback that reduces or increases an application force required by a user to manually actuate the at least one release member. The tactile feedback transmitted through the at least one battery release member. The tactile feedback is generated when the at least one release member has been manually actuated by the user a sufficient distance to allow the user to easily remove the battery pack from the device.

20 Claims, 18 Drawing Sheets

(51) Int. Cl.
*F16D 1/00* (2006.01)
*H01M 2/10* (2006.01)
*B25F 5/00* (2006.01)
*B25F 5/02* (2006.01)
*B23B 45/02* (2006.01)

(52) U.S. Cl.
CPC ..... *H01M 2/1055* (2013.01); *Y10T 29/49002* (2015.01); *Y10T 403/591* (2015.01)

(58) Field of Classification Search
CPC .. H01M 2/1016; H01M 2/1022; H01M 2/105; H01M 2/1055; Y10T 403/59; Y10T 403/91; Y10T 29/49002
USPC ............ 403/321, 322.1; 248/220.31, 220.41, 248/220.42, 220.43, 221.12, 235; 310/47, 310/50; 173/127; 429/96–100, 159
See application file for complete search history.

(56) References Cited

U.S. PATENT DOCUMENTS

| | | | |
|---|---|---|---|
| 3,366,756 A | 1/1968 | Watson | |
| 3,873,078 A | 3/1975 | Wolf | |
| 3,999,110 A | 12/1976 | Ramstrom et al. | |
| 4,118,611 A | 10/1978 | Harris | |
| 4,433,224 A | 2/1984 | Kitchen | |
| 4,578,628 A * | 3/1986 | Siwiak | H02J 7/0045 320/112 |
| 4,591,934 A | 5/1986 | Sims, Jr. | |
| 4,968,168 A | 11/1990 | Chern | |
| 4,990,731 A * | 2/1991 | Wu | H01H 13/50 200/345 |
| 5,010,219 A | 4/1991 | Kato | |
| 5,012,055 A | 4/1991 | Matsui | |
| 5,213,913 A * | 5/1993 | Anthony, III | B25F 5/02 292/244 |
| 5,268,545 A | 12/1993 | Bruner | |
| 5,298,545 A | 3/1994 | Razvan et al. | |
| 5,340,955 A | 8/1994 | Calvillo et al. | |
| 5,589,288 A | 12/1996 | Coulson et al. | |
| 5,681,667 A | 10/1997 | Bunyea et al. | |
| 5,856,038 A | 1/1999 | Mason | |
| 6,126,670 A | 10/2000 | Walker et al. | |
| 6,168,881 B1 | 1/2001 | Fischer et al. | |
| 6,340,261 B1 | 1/2002 | Furukawa | |
| 6,435,751 B1 | 8/2002 | Ono et al. | |
| 6,500,581 B2 * | 12/2002 | White | H01M 2/1022 429/100 |
| 6,656,626 B1 | 12/2003 | Mooty et al. | |
| 6,840,335 B1 | 1/2005 | Wu | |
| 7,160,132 B2 | 1/2007 | Phillips et al. | |
| 7,243,734 B2 | 7/2007 | Wu | |
| 7,619,387 B2 | 11/2009 | Amend et al. | |
| 7,816,888 B2 | 10/2010 | Rejman et al. | |
| 7,940,025 B2 | 5/2011 | Duesselberg | |
| 2003/0096160 A1 | 5/2003 | Sugiura et al. | |
| 2004/0192106 A1 | 9/2004 | Britz | |
| 2004/0242043 A1 | 12/2004 | Buck et al. | |
| 2005/0130034 A1 | 6/2005 | Buck et al. | |
| 2006/0055370 A1 | 3/2006 | Duesselberg | |
| 2006/0091858 A1 | 5/2006 | Johnson et al. | |
| 2006/0119318 A1 | 6/2006 | Serdynski et al. | |
| 2007/0175176 A1 * | 8/2007 | Lane | B23B 47/287 52/749.1 |
| 2007/0229027 A1 | 10/2007 | Roehm et al. | |
| 2007/0240892 A1 * | 10/2007 | Brotto | B23B 45/02 173/217 |
| 2008/0113262 A1 | 5/2008 | Phillips et al. | |
| 2008/0207026 A1 | 8/2008 | Meyer et al. | |
| 2010/0129701 A1 | 5/2010 | Murayama et al. | |
| 2010/0221589 A1 | 9/2010 | Friedli et al. | |

FOREIGN PATENT DOCUMENTS

| | | |
|---|---|---|
| EP | 1683608 A1 | 9/2004 |
| EP | 1481769 A1 | 12/2004 |
| EP | 2189251 A1 | 5/2010 |
| GB | 2417978 A | 3/2006 |
| GB | 2418057 A | 3/2006 |
| JP | 2009297802 A | 12/2009 |
| WO | 2008035811 A1 | 3/2008 |

OTHER PUBLICATIONS

International Preliminary Report on Patentability dated Feb. 4, 2014 from International Patent Application No. PCT/US2011/046072, filed Jan. 8, 2011.
European Search Report dated Feb. 25, 2015 from European Patent Applicaton No. 11870463.4, filed Jan. 8, 2011.
Office Action dated Mar. 25, 2015 from Chinese Patent Application No. 201180073917.9, filed Jan. 8, 2011.
Office Action dated Oct. 8, 2015 from Chinese Patent Application No. 201180073917.9, filed Jan. 8, 2011.
International Search Report dated Feb. 19, 2013 from International Patent Application No. PCT/US2012/049161 filed Aug. 1, 2012.
International Preliminary Report on Patentability dated Feb. 4, 2014 from International Patent Application No. PCT/US2012/049161 filed Aug. 1, 2012.
Office Action dated Feb. 10, 2015 from Chinese Patent Application No. 201280025879.4 filed Aug. 1, 2012.
European Search Report dated Feb. 13, 2015 from European Patent Application No. 12819972.6 filed Aug. 1, 2012.
Office Action dated Sep. 28, 2015 from Chinese Patent Application No. 201280025879.4 filed Aug. 1, 2012.
Office Action dated Mar. 14, 2016 from Chinese Patent Application No. 201280025879.4 filed Aug. 1, 2012.
Office Action dated Dec. 11, 2014 from U.S Appl. No. 13/564,026, filed Aug. 1, 2012.
Office Action dated May 21, 2013 from U.S. Appl. No. 13/564,026, filed Aug. 1, 2012.
Office Action dated Nov. 16, 2015 from U.S Appl. No. 13/564,026, filed Aug. 1, 2012.
Office Action dated Sep. 27, 2016 from U.S. Appl. No. 131564,026, filed Aug. 1, 2012.

* cited by examiner

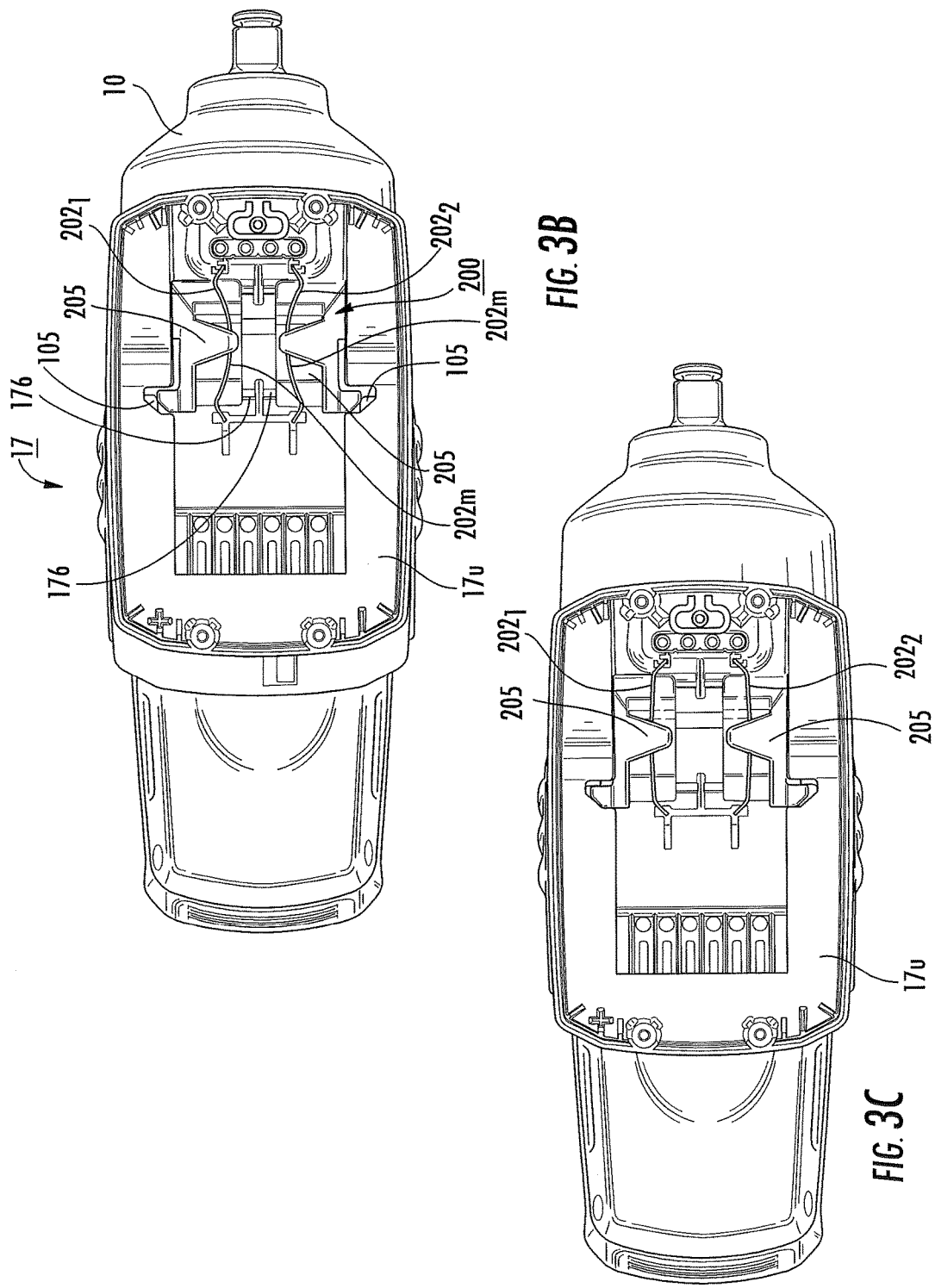

BATTERY PACK RELEASE WITH TACTILE FEEDBACK FOR CORDLESS POWER TOOLS

RELATED APPLICATION

This application is a 35 USC §371 national phase application of PCT/US2011/046072, filed Aug. 1, 2011, the contents of which are hereby incorporated by reference as if recited in full herein.

FIELD OF THE INVENTION

This invention relates to electric devices with releasable battery packs.

BACKGROUND OF THE INVENTION

Various electric devices including cordless electric power tools are well-known. Examples of such tools include, but are not limited to, drills, drill drivers, impact wrenches, grease guns and the like. Such devices can use releasable, typically rechargeable, battery packs.

SUMMARY OF EMBODIMENTS OF THE INVENTION

Embodiments of the invention provide tactile feedback assemblies for devices with releasably engageable batteries that may be particularly suitable for releasing battery packs from cordless power tools.

Some embodiments are directed to battery packs for a device (e.g., an electric device). The battery packs can include a battery pack housing and at least one externally accessible manually actuatable battery pack release member held by the battery pack housing. The battery pack release member has an actuation stroke distance from a home position to a fully deployed position. The battery pack also includes a latch held by the battery pack housing in communication with the battery pack release member that releaseably locks the battery pack housing to a device and a tactile feedback mechanism that is held by the battery pack housing and is in communication with the battery pack release member or that defines an externally accessible part of the battery pack release member. The tactile feedback mechanism generates a tactile feedback at a defined trigger point of the battery pack release member stroke distance that is before the fully deployed position that reduces or increases an application force required by a user to manually actuate the at least one release member thereby indicating to the user the latch is in a prescribed position to allow the battery pack to now be easily removed from the device.

The change in application force can be at least about 10% less, typically between about 20-50% less, than that used initially by a user during a pre-trigger phase of the application force applied by a user to delatch the battery pack.

The tactile feedback mechanism can generate a reduced reaction or resistance force that allows a user to apply an increased application force only up to a defined point of the actuation of the release member, at which time a decreasing force, due to the reduced reaction or resistance force, needed to actuate the release member provides the tactile feedback that the battery pack can now be easily released from the device.

The device can be a cordless power tool.

The tactile feedback mechanism can include at least one buckle spring.

The buckle spring can be a leaf spring that is elongate and has a pre-formed shape that is curvilinear with a peak portion at a medial lengthwise location thereof before assembly. The buckle spring can be oriented to extend horizontally in the battery housing body and buckles in response to a transversely applied force applied by a manual actuation of the at least one release member.

The at least one buckle spring can be a curvilinear flat leaf spring that is held in a pre-load configuration and that buckles in response to depression of the at least one release member, then returns to the pre-load configuration on its own accord when the release member returns to its home position.

The tactile feedback mechanism can include at least one spring mount member held inside the battery pack housing that holds a buckle spring, the buckle spring having a length dimension and a width dimension, the length dimension associated with its long edges, the width dimension extending orthogonally between the long edges across its primary surfaces. The at least one spring mount member holds the buckle spring with its long edges extending substantially horizontally and with its primary surfaces held substantially vertically. The at least one spring mount member is configured to translate inwardly to deflect a medial portion of the buckling spring to generate the tactile feedback.

The at least one battery pack release member can have a monolithic unitary body with an upper portion and a lower portion, the upper portion residing outside the battery housing body to define the user accessible release member, the second portion residing inside the battery housing and defining a laterally inwardly translating portion of the tactile feedback mechanism.

The at least one spring mounting member can have an outer locking leg that slidably translates inwardly a distance from a slot in an inner surface of the battery pack housing and the spring mounting member can also have at least one channel that slides along a liner rail formed in the battery pack inner surface.

The tactile feedback mechanism can include first and second laterally spaced apart holding members inside the battery pack housing that translate inwardly toward each other in response to actuation of the first and second release members. Inward translation of the holding members can buckle a buckle spring or move at least one magnet to generate the tactile feedback.

The tactile feedback mechanism can include at least one dome spring washer in communication with the at least one release member.

The at least one dome spring washer can include a plurality of stacked dome spring washers.

The tactile feedback mechanism can include at least one magnet, magnetorheological (MR) material or ferrofluid and uses a magnetic field to generate the tactile feedback.

The tactile feedback mechanism can include first and second magnets, or one magnet and ferromagnetic material or MR fluid.

The tactile feedback mechanism can include first and second magnets, at least one of which travels toward or away from the other in response to actuation of the at least one release member to generate the tactile feedback.

The at least one magnet can be configured to move toward the other magnet to generate an attraction force that provides the tactile feedback.

Still other embodiments are directed toward cordless power tools that include: (a) a power tool housing with a base; and (b) a battery pack with at least one blind latch that releasably engages the power tool. The battery pack can include: (i) at least one manually actuatable battery pack release member that allows a user to disengage the battery pack from the power tool; and (ii) at least one tactile feedback mechanism in communication with the at least one battery pack release member that is held inside the battery pack or that defines an externally accessible part of the battery pack release member (e.g., external dome spring "push button" gasket). The tactile feedback mechanism generates tactile feedback to a user that reduces or increases an application force required by a user to manually actuate the at least one release member, the tactile feedback transmitted through the at least one battery release member to the user. The tactile feedback is generated when the at least one release member has been manually actuated by the user a sufficient distance to allow the user to easily remove the battery pack from the device.

The tactile feedback mechanism can include at least one of the following that is communication with the at least one battery pack release member: a flat leaf buckle spring, a dome spring washer, a coil spring, a magnet, magnetorheological (MR) fluid and ferrofluid.

The tactile feedback mechanism can include an elongate self-restoring buckle spring. The tactile feedback mechanism can include at least one (spring) dome washer or gasket (metallic or elastimeric or combinations of both materials).

Still other embodiments are directed to methods of releasing a rechargeable battery pack from a cordless power tool having at least one battery pack release member in communication with a respective at least one blind latching member, and a tactile feedback mechanism. The methods include: (a) manually actuating the at least one battery pack release member to initiate release of the battery pack from the power tool; and (b) generating an abrupt reduction in resistance or reactance force to a user through the at least one battery pack release member in a delatching direction at a trigger point before a fully deployed position of the at least one battery pack release member thereby generating tactile feedback to a user such that the user can tactilely feel a snap, click and/or substantially reduced or increased reaction force, in response to the manually actuating step, when the latching member is moved a distance sufficient to allow the user to easily remove the battery pack from the power tool, The generating step can be carried out by at least one of the following: (i) moving at least one magnet in communication with the battery release member (ii) buckling a buckle spring that may optionally be a self-restoring buckle spring in communication with the release member; (iii) applying force to at least one spring dome washer in communication with the release member; or (iv) pushing an externally accessible dome spring gasket inward, the dome spring gasket forming part of the battery release member.

The foregoing and other objects and aspects of the present invention are explained in detail in the specification set forth below.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 3B illustrates the view shown in FIG. 3A based on the partial engagement of the tool and battery pack shown in FIG. 2B according to embodiments of the present invention.

FIG. 3C illustrates the view shown in FIG. 3A based on the partial engagement of the tool and battery pack shown in FIG. 2C according to embodiments of the present invention.

DESCRIPTION OF EMBODIMENTS OF THE INVENTION

Figure 1B:
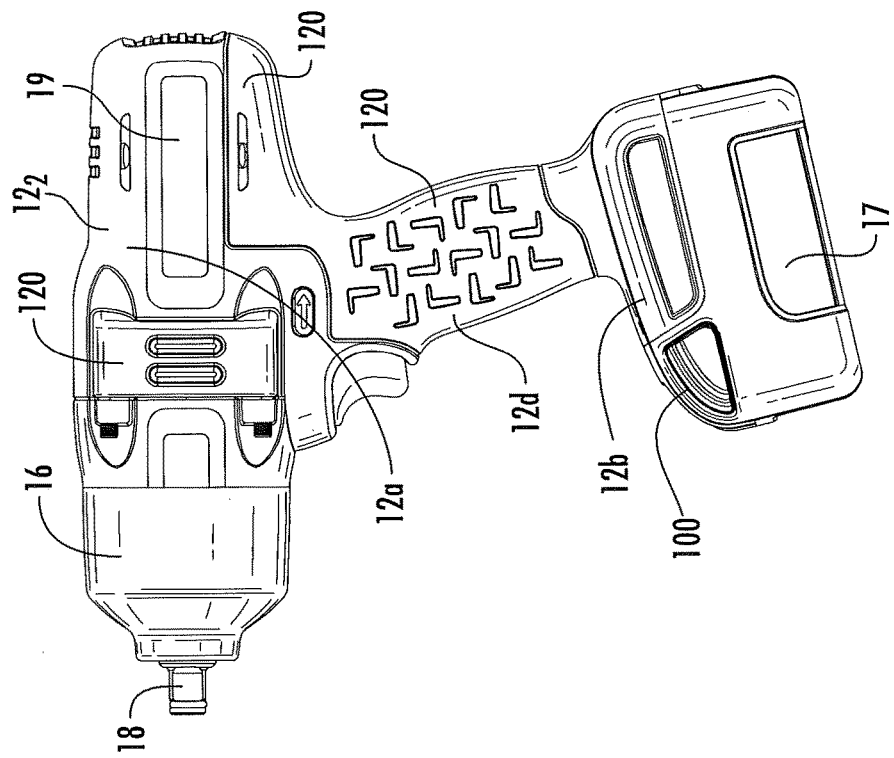
FIG. 1B is a side view of the tool shown in FIG. 1A.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when a feature, such as a layer, region or substrate, is referred to as being "on" another feature or element, it can be directly on the other feature or element or intervening features and/or elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein.

The term "cordless" power tool refers to power tools that do not require plug-in, hard-wired ("corded") electrical connections to an external power source to operate. Rather, the cordless power tools have electric motors that are powered by on-board batteries, such as rechargeable batteries. A range of batteries may fit a range of cordless tools. In some embodiments, a "universal" battery pack can operate a number of different power tools. Different cordless power tools may have a variety of electrical current demand profiles that operate more efficiently with batteries providing a suitable range of voltages and current capacities. The different cordless (e.g., battery powered) power tools can include, for example, screwdrivers, ratchets, nutrunners, impacts, drills, drill drivers, grease guns and the like. The cordless power tools can have a linear body, a pistol body or an angled forward end. The cordless power tools can releasably engage a battery pack as is known by those of skill in the art.

The term "blind latch" refers to a latch that engages an internal locking surface, feature or member of a housing in a manner that is not visually accessible to a user when the latch is locked to the housing.

Figure 1A:
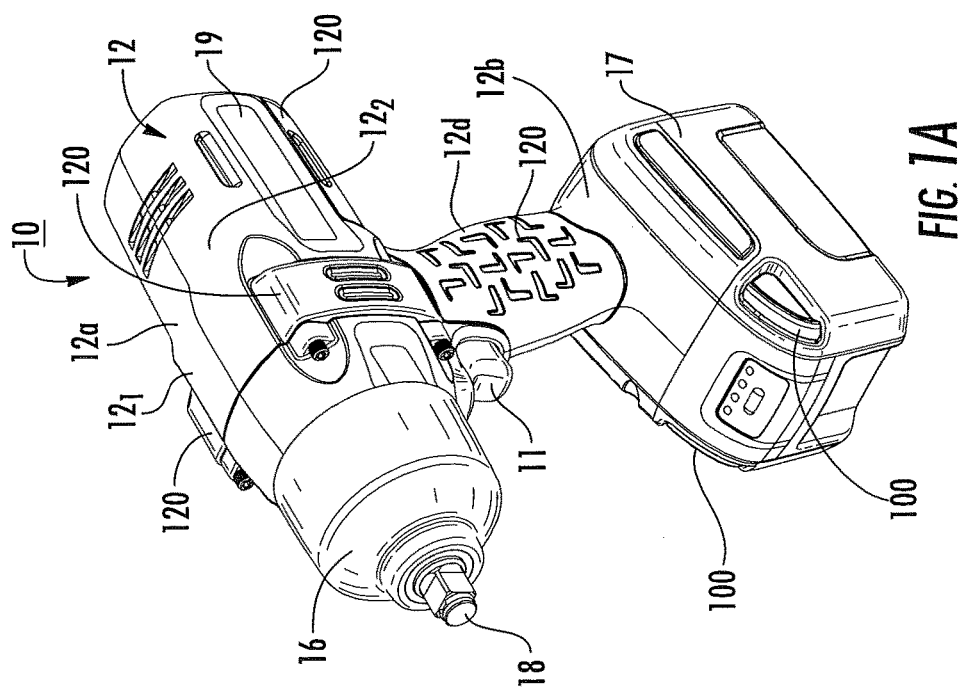
FIG. 1A is a side perspective view of an exemplary cordless power tool according to embodiments of the present invention.

FIGS. 1A and 1B illustrate an example of a type of power tool 10 that includes a housing 12, a gearcase 16 and a tool output shaft 18. As shown in FIGS. 1A, 1B and 2, the housing 12 encases a motor 14 and partially surrounds the gearcase 16. The gearcase 16 can be metallic and encloses a drive train 20 (FIGS. 11 and 12). In this embodiment, the lower portion of the housing can releasably engage a battery pack 17. The housing 12 can include an external control such as a trigger 11 and a UI (user interface) 19 with a display. However, the tool 10 and/or housing 12 can have other configurations and may enclose the gearcase and/or have other handle configurations.

In some embodiments, and as shown, the housing can be a "pistol" type housing that can include first and second substantially symmetrical clam shell bodies $12_1, 12_2$ with an upper substantially axially extending head portion 12a that merges into a downwardly extending hand grip portion 12d.

As is well known to those of skill in the art, the housing, which may optionally be formed using shell bodies $12_1, 12_2$, can comprise a substantially rigid substrate 12r that has sufficient structural strength (and hardness) to be able to support the tool components, with or without reinforcement members. The substantially rigid substrate 12r for each shell body $12_1, 12_2$ can comprise a single or multi-shot, injection-molded shell body. An example of a suitable moldable composite material is glass-filled nylon. However, other non-metallic materials, typically composite materials that comprise polymeric materials, can be used, particularly those with a hardness or durometer of at least about 90 Shore A.

Still referring to FIGS. 1A and 1B, the outer surface of the housing 12 can optionally include external overmold portions 120 of an elastomeric (e.g., rubber or rubber-like) material, such as a thermoplastic elastomeric material, that can provide a softer tactile grip relative to the rigid substrate material 12r of the housing 12. The external overmold portions 120 may alternatively or additionally provide some shock protection for internal components due to inadvertent drops and the like. Where used, the external overmold portions 120 may all be formed of the same material or some may be formed of different materials with the same or different Shore A durometers. In particular embodiments, the overmold material can have, for example, a Shore A durometer that is between about 40-80, more typically between about 40-60. There are many suitable elastomeric materials as is well known to those of skill in the art.

Figure 2A:
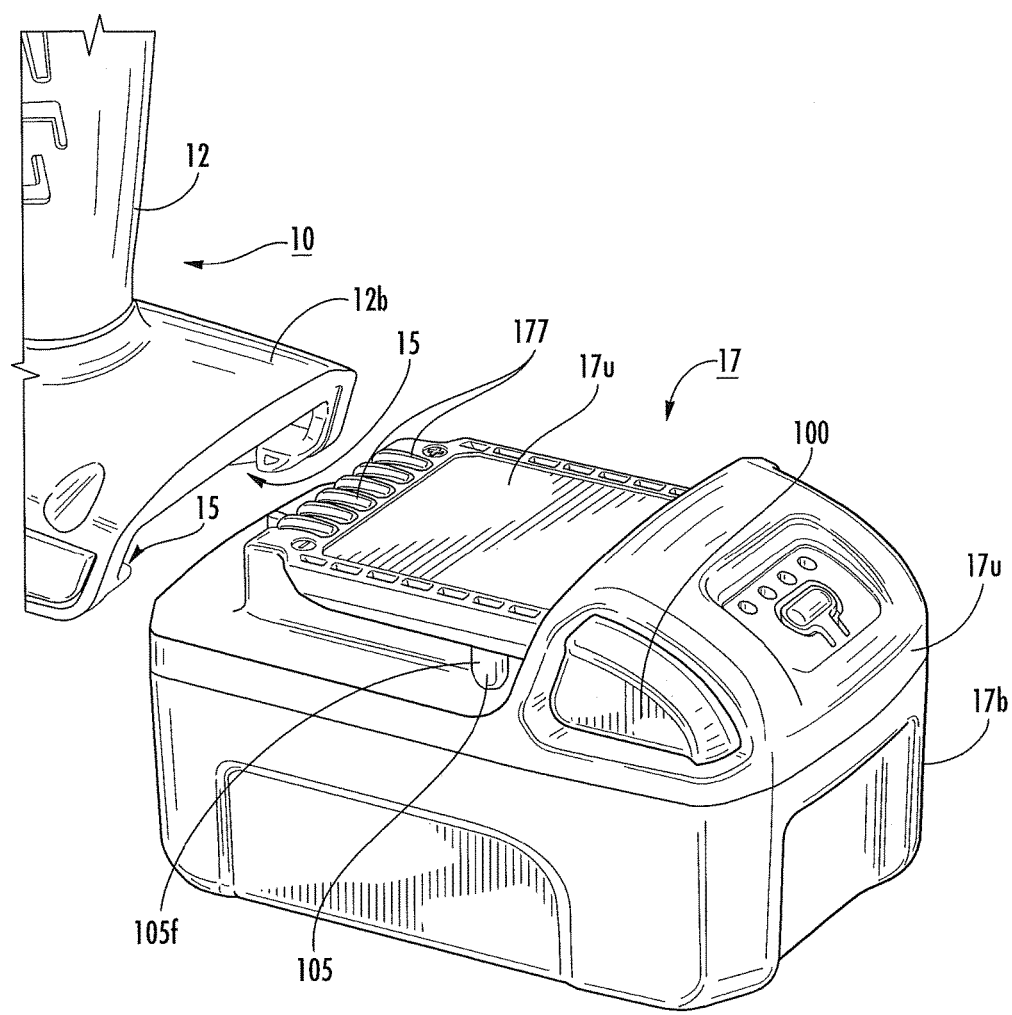
FIG. 2A is an enlarged side perspective view of a battery pack with latches that releasably engage a power tool according to embodiments of the present invention.
Figure 2B:
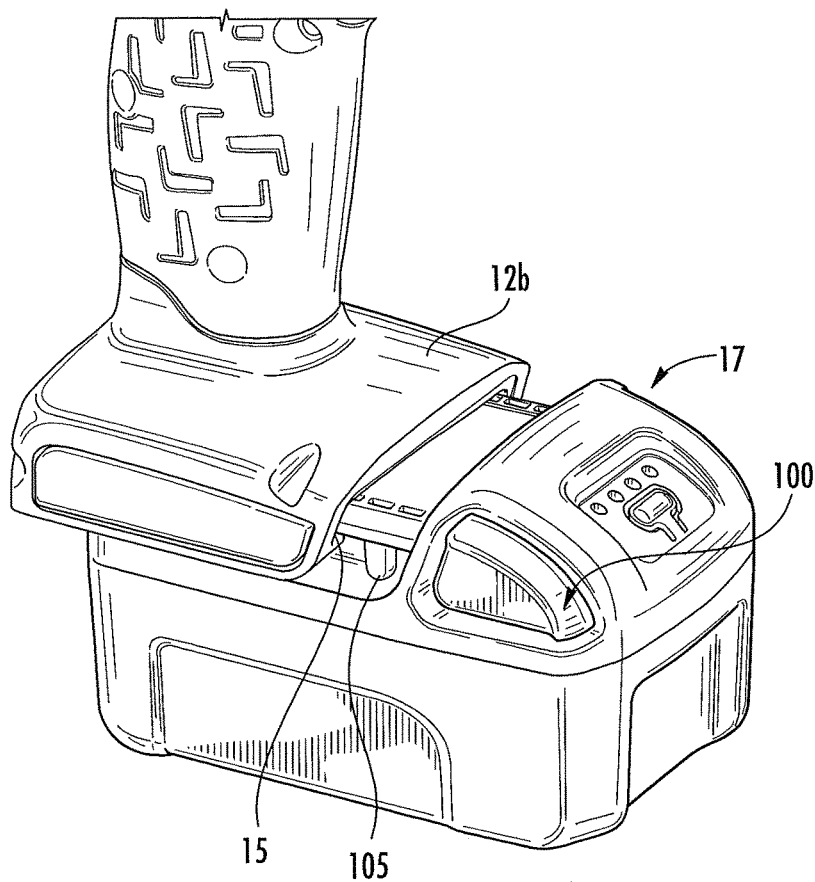
FIG. 2B illustrates the device of FIG. 2A with the power tool housing slidably engaging the battery pack according to embodiments of the present invention.
Figure 2C:
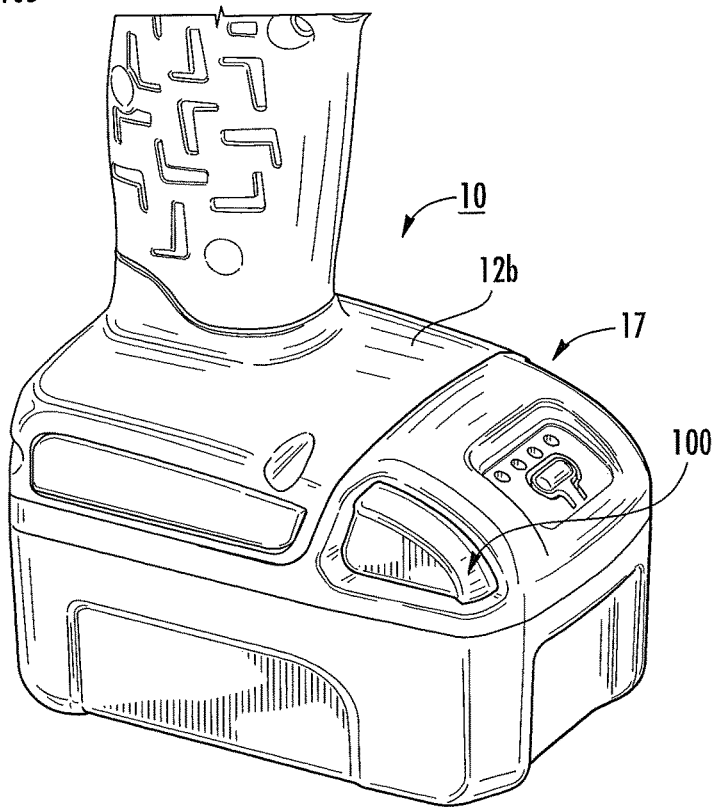
FIG. 2C illustrates the power tool and battery pack of FIG. 2A in a fully seated configuration.
Figure 3A:
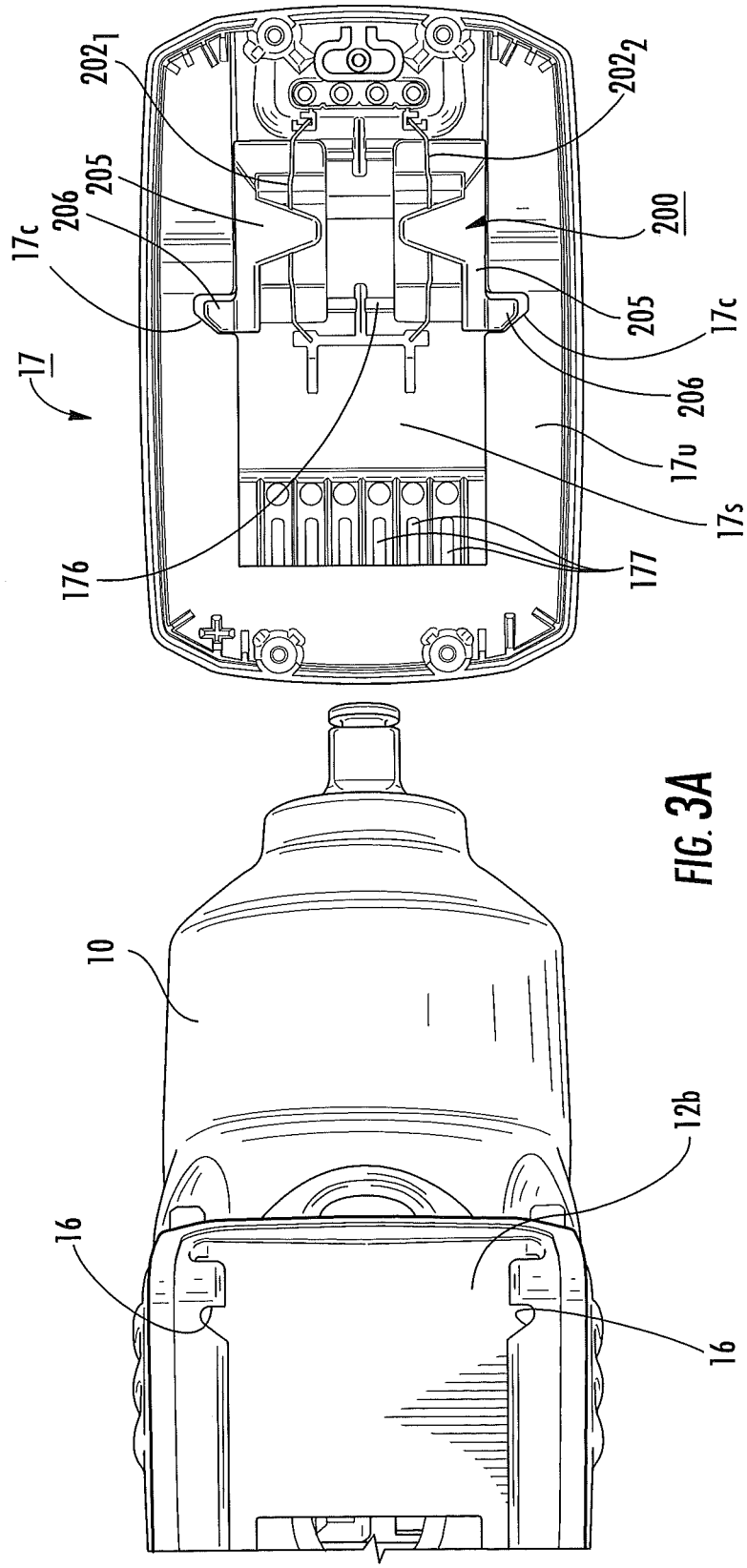
FIG. 3A is a bottom view of the power tool with a bottom view of an upper portion of the battery pack shown in FIG. 2A illustrating an example of a tactile feedback mechanism that cooperates with the battery pack release members according to embodiments of the present invention.

FIGS. 2A-2C illustrate that the battery pack 17 can include at least one latch 105 that releasably engages the power tool housing 12. The battery pack 17 also includes at least one manually (user) depressible release member 100 that translates the at least one latch 105 to allow the detachment of the battery pack 17 from the tool housing 12. The latch 105 can include a downwardly extending finger 105f (FIG. 2A) that slidably engages a slot 16 (FIG. 3A). The slot 16 can be an open slot 16 formed in an inwardly extending substantially horizontal ledge 15 in the base of the tool housing 12b. The slot 16 can have a curvilinear perimeter shape. As shown, each side of the base 12b includes an inwardly extending ledge with a slot 16 oriented so that the opening of a respective slot faces the other across a cavity in the base of the housing 12b. Referring to FIGS. 2A-2C, the latch 105 can extend downwardly under the upper surface 17s. To actuate the release member 100, a user pushes down both release members 100, typically substantially concurrently, which causes the respective latch 105 to move up and/or inward to a prescribed position to allow the battery pack to be disengaged from the power tool (the movement of the latch can be to move it inward toward the center open space away from the respective ledge 15).

The latch and release configurations are not limited to the embodiment shown and can be any suitable configuration. For example, in some embodiments, the battery pack 17 can employ a single release member. In addition, the one or more release members 100 can be configured to translate using an inward application (push) force, rather than a downward force, or even outward or upward force. In yet other embodiments, a user can manually apply a dual application force, e.g., a manual push inward and downward. In addition, although particularly useful for power tools, the battery packs can be configured for use with other electric devices.

Figure 6A:
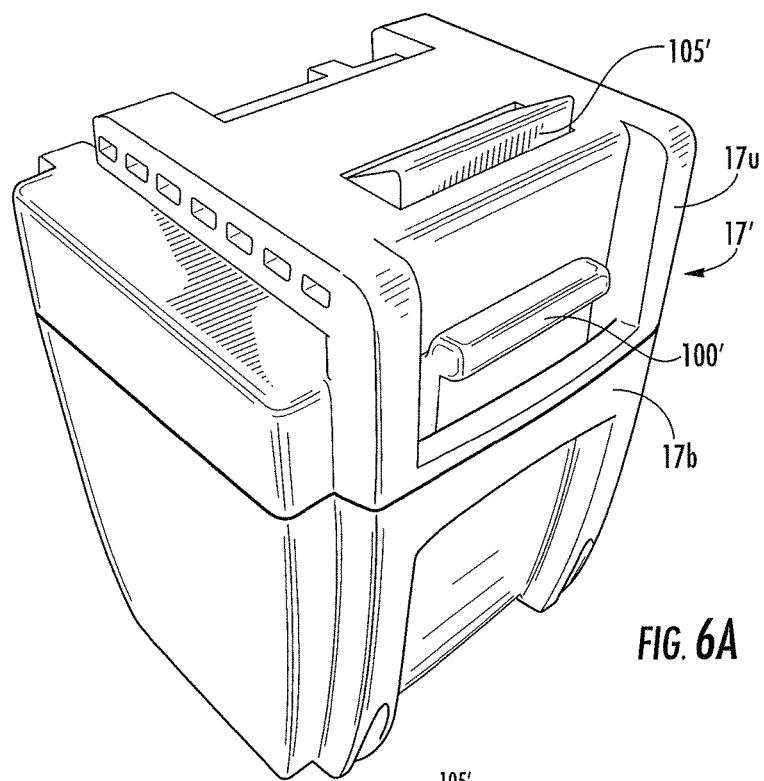
FIG. 6A is a top side perspective view of an alternate battery pack configuration with an alternate latch configuration and a single release member according to embodiments of the present invention.
Figure 6B:
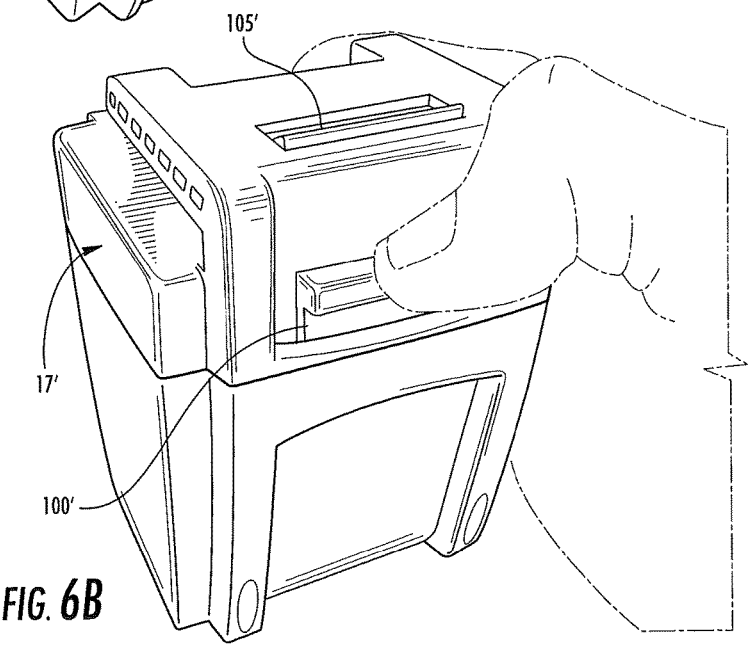
FIG. 6B illustrates the release member being manually depressed and the latch moving down in response thereto.

FIGS. 6A and 6B illustrate that the latch 105' is a lock member that can translate up and down from a medial position on an upper surface of the battery pack 17' to engage a portion of the power tool 10. The release member 100' is shown as a single member that resides proximate a front surface of the battery pack 17'. To actuate the release, a user pushes the release member 100' down.

Figure 5A:
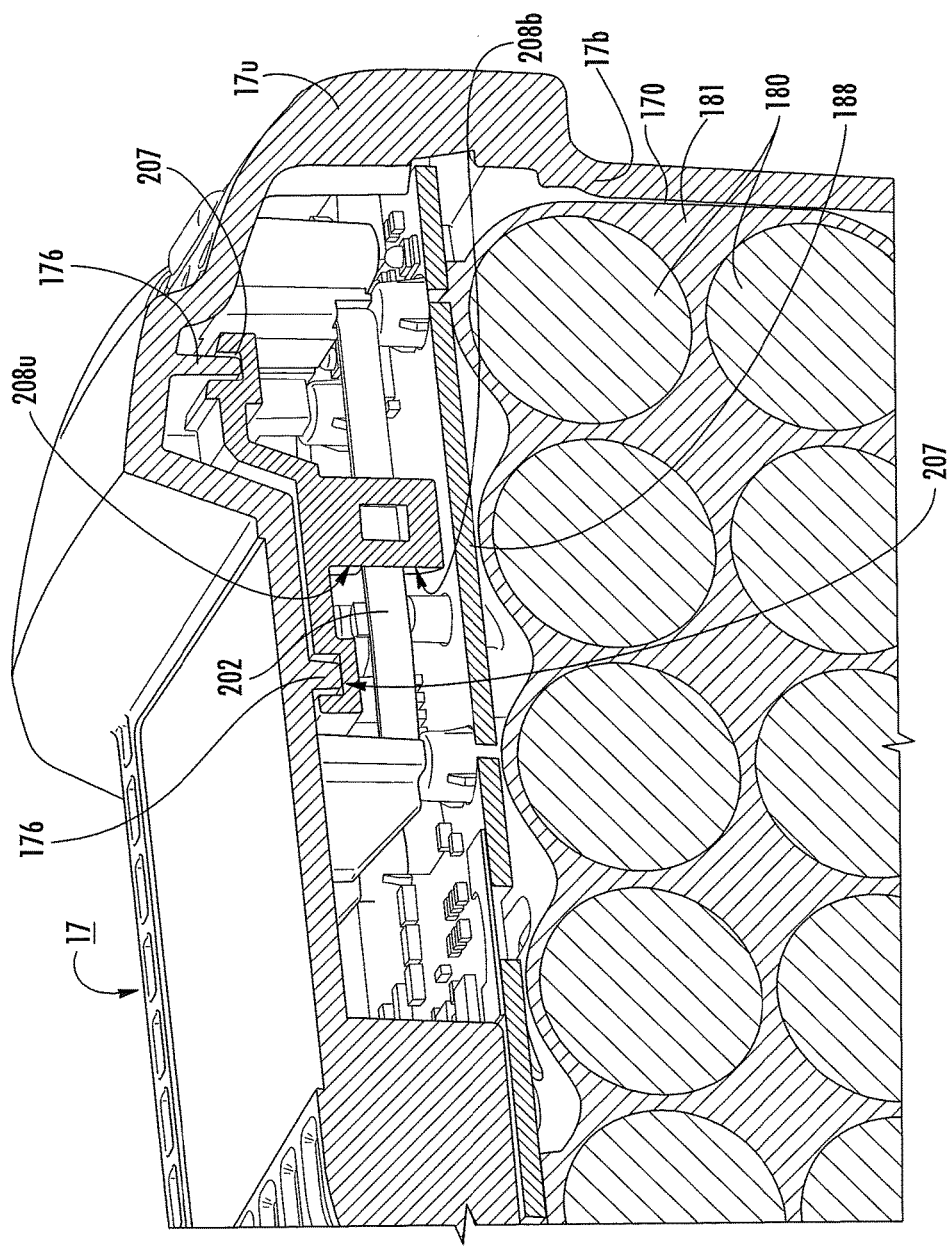
FIG. 5A is a partial cutaway, side perspective view of a battery pack with the tactile feedback mechanism shown in FIGS. 3A-3C and 4A-4C according to some embodiments of the present invention.
Figure 5B:
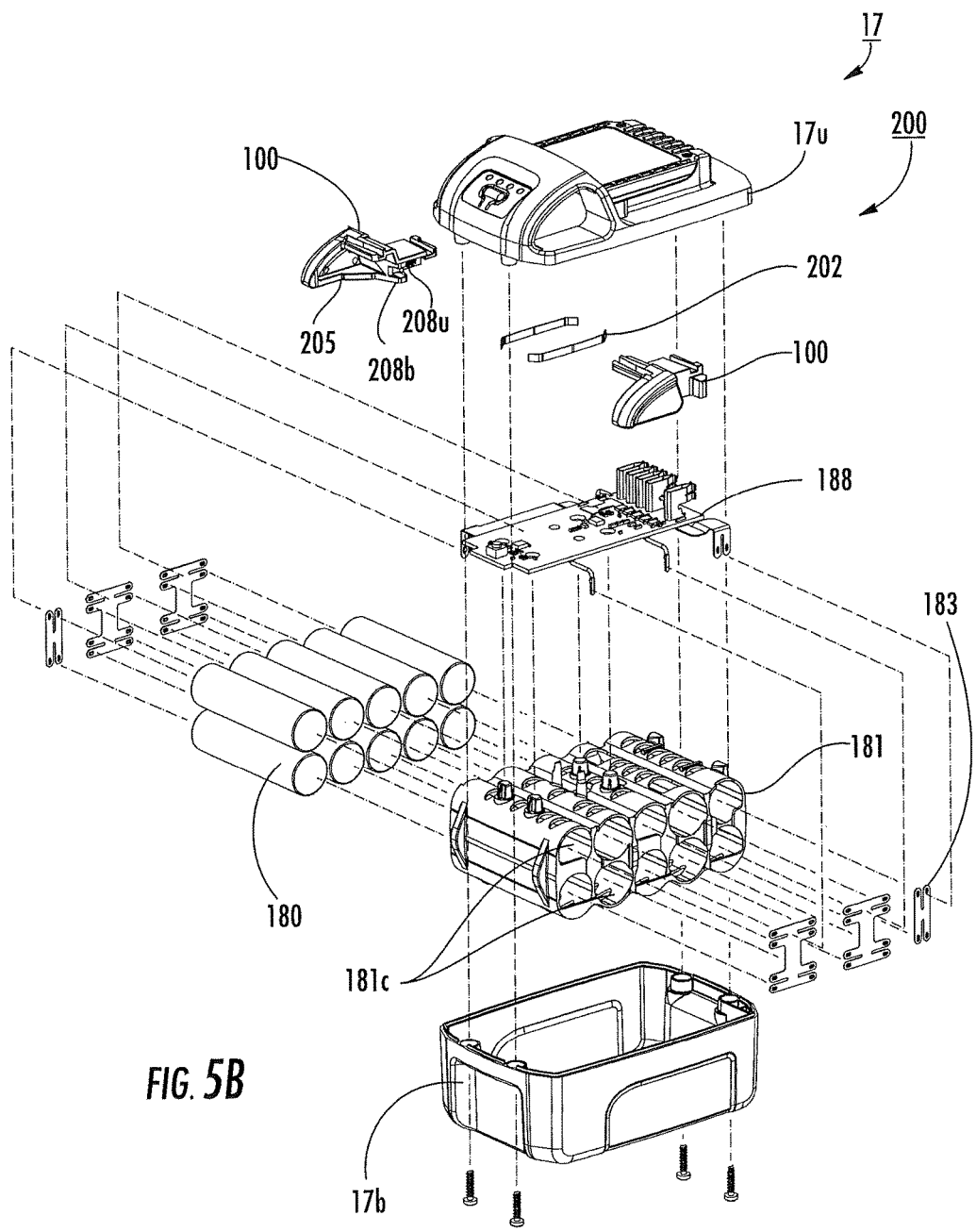
FIG. 5B is an exploded view of an exemplary battery pack with the tactile feedback mechanism according to some embodiments of the present invention.

The battery pack 17, 17' can have an upper body 17u and a lower body 17b that define a cavity 170 (FIGS. 5A, 5B, 6C) therebetween. The battery pack upper and lower body, 17u, 17b, respectively can releasably or integrally attach to each other to encase battery cells 180 held in a semi-rigid elastomeric carrier 181 (FIGS. 5A, 5B). The battery pack 17, 17' can have an exposed upper surface 17s with electrical contact pads 177.

The battery pack 17, 17' includes a tactile feedback mechanism 200 that cooperates with a release member 100, 100' to increase or decrease the stiffness of the actuation movement and/or force in a manner sufficient to provide a user with a tactile feedback associated with when the release member 100, 100' has been depressed a sufficient amount to disengage the latch 105 from locking position in the housing 12 to indicate to a user that the battery pack 17 can now be easily released from the power tool housing 12. As the latch 105 is typically positioned in a blind location, not readily externally visible by a user when the battery pack 17 is attached to the power tool housing 12, the tactile feedback mechanism 200 is configured to provide a user a tactile feel for when the latch(es) 105, 105' has been retracted far enough to allow for easy removal of the battery pack 17 from the tool 10.

In the past, battery packs have used coil or leaf springs by which a user must press the release member with ever increasing force to retract the buttons and latches to disengage the battery from the tool. This can be frustrating to a user because it is difficult for user to know how far or hard they should press before the buttons and latches holding the battery pack are retracted far enough to allow for ease or removal. The tactile feedback mechanism 200 can be configured to allow a user to press with increasing force up until a certain trigger point, after which the reaction force of the device (the resistance to the translation or actuation force being applied by the user/operator) changes abruptly, e.g., rapidly decreases or rapidly increases, associated to indicate to the user as to when the latch or latches 105, 105' is/are in a release position. This sudden, relatively large, change in reaction and/or resistance force provides a tactile feedback to a user that the battery is ready to be easily removed from the power tool. This reflects that the latch 105, 105' is now in a prescribed release position, is disengaged or easily disengageable by the user, so as to be able to (slidably) release the battery pack from the housing.

In some embodiments, the tactile feedback can generate (i) a reduced reaction and/or resistance force to a user that is at least about 10% less, more typically 20-60% less, such as between about 30-45% less, than the initial application force applied by a user to start to release the latch or (ii) an increased reaction and/or resistance force that is between about 30-100% greater than the initial application force applied by a user to start to release the latch. In some embodiments, the tactile feedback can be defined as the tactile ratio which equals $((F_{max}-F_{min})/F_{max})(\times 100)$, where $F_{max}$ is the trip force, and $F_{min}$ is the return force.

In some embodiments, the trip force is about 3 lbs, and the return force is about 1.75 lbs, providing about a 42% tactile ratio. Higher tactile ratios, e.g., above 20%, such as about 30%, about 40%, about 45% or even higher may be more readily distinguishable to the user, but a lower tactile ratios, such as about 10% (or maybe even lower) may also be used.

In a preferred embodiment, the tactile feedback mechanism is configured so that the reaction and/or resistance force (Fa) rapidly decreases after the "change" or "trigger" point associated with sufficient displacement travel distance of the at least one release member 105, 105' to allow for the battery pack to be easily released and can generate a "snap" and/or "click" like tactile feel, which may include an associated audible response as an audible indication that the release button has been sufficiently translated along its travel stroke distance.

Figure 15A:
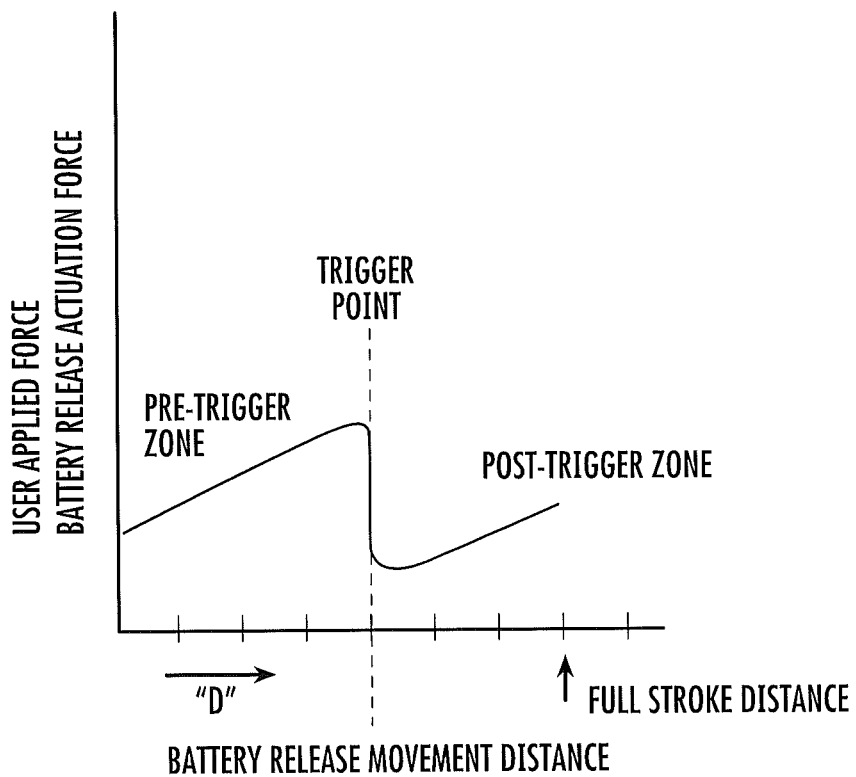
FIGS. 15A and 15B are graphs of exemplary actuation forces that can be applied by a user to move a release member over a stroke distance of the release member according to embodiments of the present invention.
Figure 15B:
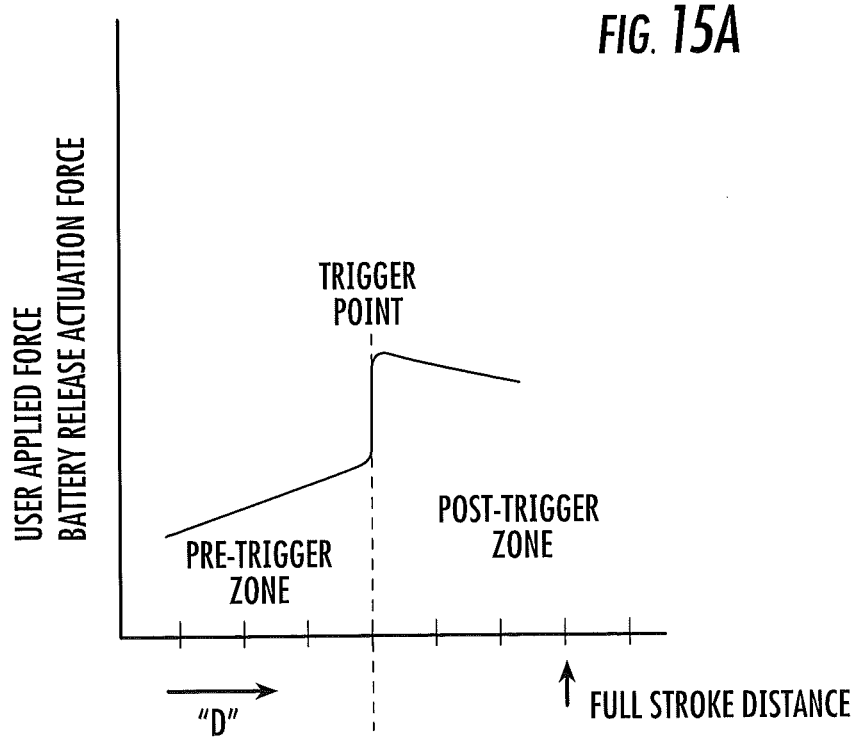

FIGS. 15A and 15B graphically illustrate that the battery release member(s) 100 can have a stroke distance between a home and fully deployed position and the actuation force Fact a user needs to apply to the release member to cause displacement changes over this distance. The tactile feedback mechanism 200 can be configured to generate an abrupt change in resistance and/or reaction force as the release member moves in a delatching direction over its stroke distance, at a prescribed trigger point. The trigger point resides between the home and full stroke distance and corresponds to when the latch has been disengaged sufficiently to allow for easy removal of the battery pack 17 from the device/power tool. The tactile feedback mechanism that communicates with the battery release member 100 generates the abrupt decrease (FIG. 15A) or increase (FIG. 15B). In some embodiments, the abrupt decrease can be a decrease of between about 0.25 lbs to about 2.5 lbs and any value therebetween, including about 0.5 lbs, about 0.75 lbs, about 1 lb, about 1.25 lbs, about 1.5 lbs, about 1.75 lbs and about 2 lbs. Higher and lower changes in force may also be used.

In the embodiment shown in FIGS. 2A-2C, 3A-3C, 4A-4C, 5A and 5B, the tactile feedback mechanism 200 includes at least one buckle spring 202. As shown, two separate, spaced-apart buckle springs $202_1$, $202_2$ are used, one in communication with a respective one of the release members 100. However, in other embodiments one closed loop continuous buckle spring 202 can be used instead of the two shown and each side can be configured to communicate with a respective release member 105.

In the embodiment shown, a respective buckle spring 202 is held by a spring mounting member 205 that is connected to a respective release member 100. Optionally, the spring mounting member 205 can be formed as an integral part of the release member 100. Thus, as shown in FIG. 5B, the release member 100 can have a complex molded unitary body with the spring mounting member 205 defining a bottom portion thereof and with the top portion defining the user accessible release member 100 (e.g., button).

FIG. 5B also illustrates the battery cells 180 can be held in a unitary elastomeric (semi-rigid) carrier 181 with elongate channels 181c that hold the respective cells in a desired alignment and can provide vibration or shock insulation/resistance. Cell straps 183 can be used to electrically connect cells 180 as is known to those of skill in the art.

In this embodiment, the buckle spring 202 "buckles" when the release member 100 moves the spring mounting member 205 a distance "D" inward sufficient to depress the medial portion 202m of the spring to its buckling point, this movement is typically translates between about 2-10 mm, typically about 5 mm. This distance "D" is defined to substantially correspond to when the release member 100 has been moved a distance sufficient to release the latch 105 from the housing 12. At the buckling point, a user will feel significantly less reaction force when depressing the release member 100, thereby indicating that the battery pack can be easily released from the power tool.

The spring mounting member 205 can have a leg portion 206 that slidably engages a channel 17c formed in an interior surface 17s of the upper body 17u of the battery back 17. This interior surface 17s is typically a horizontal, substantially planar surface. The interior surface 17s can also include at least one linear rail 176 that engages a corresponding channel 207 (FIG. 4A) in the spring mounting member 205 (FIG. 5A). As shown, there are two spaced apart rails 176, one closer the front of the upper body 17u and the other longitudinally spaced apart proximate a rearmost portion of the release member 100. Each rail 176 engages a respectively positioned one of two channels 207 in the mounting member 205. However, one rail or more than two rails and corresponding channels can be used to facilitate straight inward movement of the members 205 to deflect the spring 202 irrespective of where the user applies the application force on the curved release member shown in FIGS. 1A, 2A and 4C, for example. In other embodiments, the channels 207 can be formed in the housing and the rails 176 can be provided on the spring mounting members 205. Similarly, the slot and leg configuration shown, for example in FIG. 3A, can be reversed so that the mounting member 205 can have a slot or channel 17c that slidably releasably engages a leg 206 on the upper body 17u. Other ways the mounting member(s) 205 can travel is by rotating about a pivot point, such that the spring actuation point still travels the desired distance "D", e.g., between about 2-10 mm, more typically about 5 mm, as opposed to linearly sliding on tracks 176.

Figure 4A:
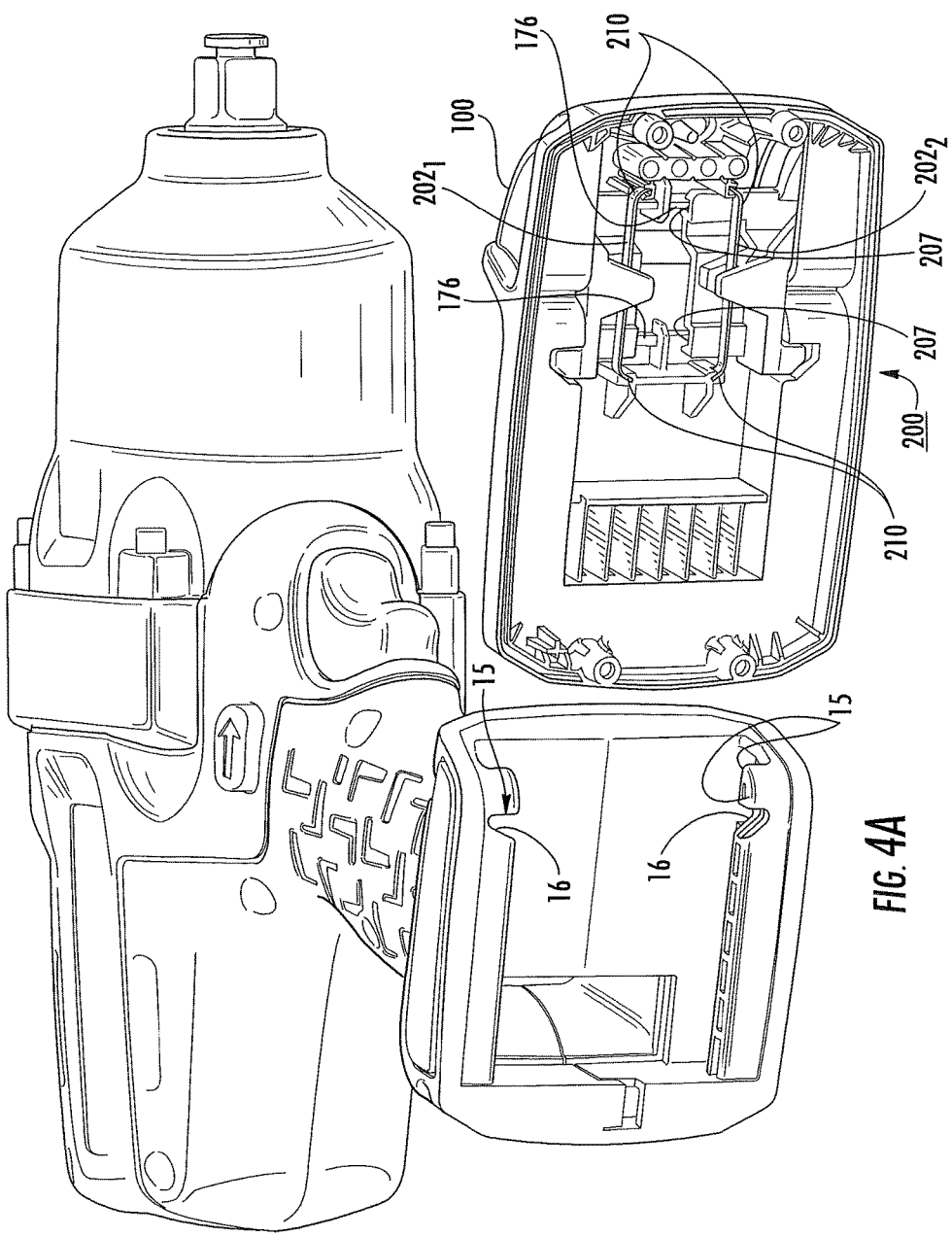
FIGS. 4A-4C are sequential, bottom perspective views corresponding to FIGS. 2A-2C and 3A-3C.
Figure 4B:
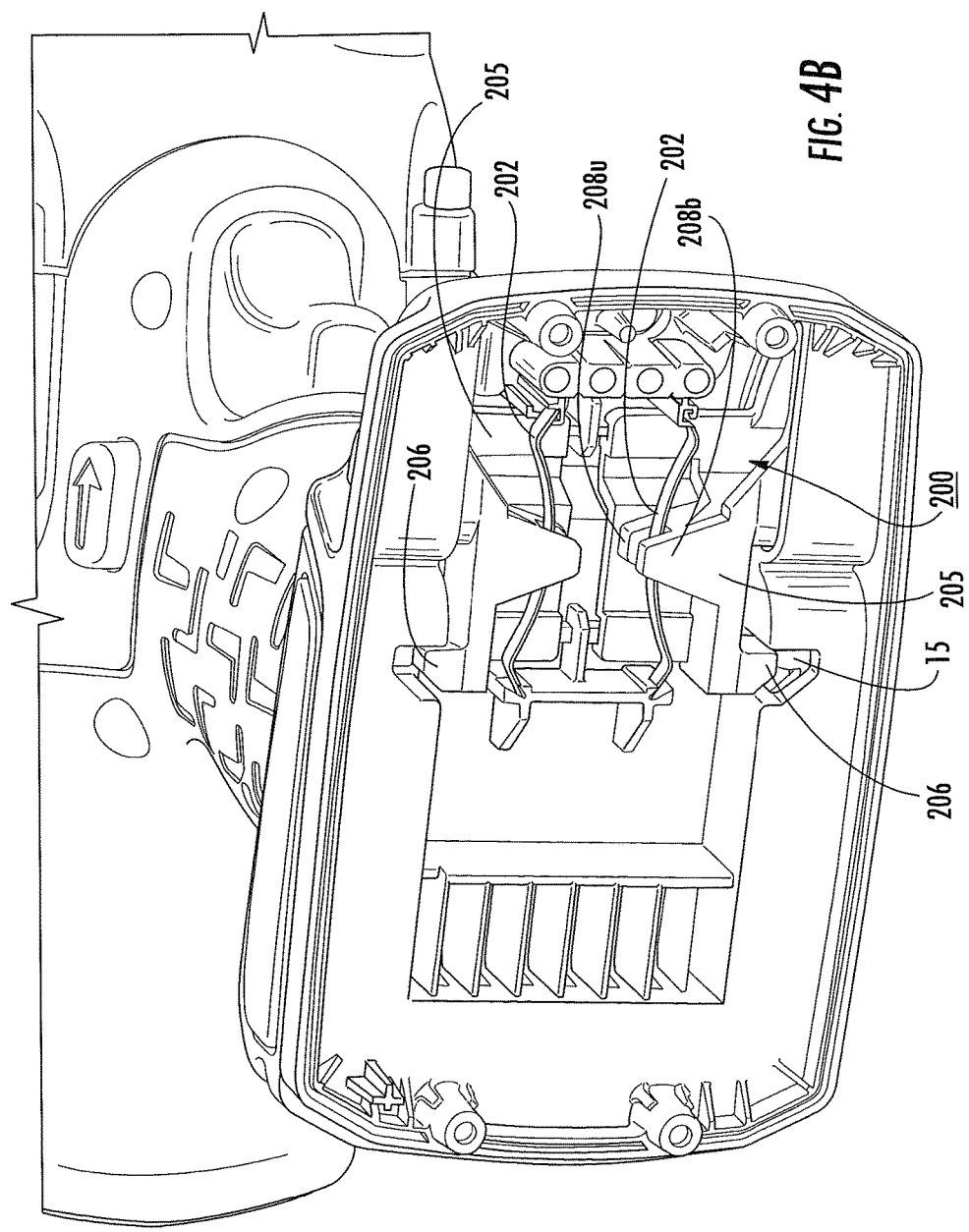

As shown in FIGS. 4B and 5A, the spring mounting members 205 can also include a medial portion with closely spaced upper and lower members 208u, 208b that hold the spring 202, oriented horizontally with its primary (flat) surfaces held vertically, therebetween. End portions of the spring or springs 202 can be attached to the housing inner surface using downwardly extending ribs 210 as shown in FIG. 4A. The attachment can be via frictional engagement, adhesive engagement, crimping, clamping or other suitable attachment means.

In some embodiments, an alternate way to achieve the buckling of the spring 205 (or spring washer or gasket as 230 will be discussed below) is to attach the spring to the release member so that the spring and release member move together. The spring 202 can react against a fixed point of the housing causing the tactile response (as opposed to moving a point on the release member (e.g., button moves, moving mounting members 205) into a stationary spring.

FIGS. 5A and 5B also illustrate that the battery pack 17 can include a plurality of battery cells 180 held under a printed circuit board 188 inside the housing. The tactile feedback mechanism 200 can reside above the cells 180 and the printed circuit board 188.

In some embodiments, in operation, as a user depresses the release members 100, the application force pushes the spring mounting members 205 closer together, slidably translating a portion of the legs 206 inward from respective channels 17c, guided by rails 176. In reverse, when the battery is inserted into the tool, the tool portion 15 presses on legs 206. This is similar to how the user's fingers press the release members (e.g., buttons) 100, except the portion 15 presses on opposite side of the spring center point, compared to the user pressing members 100. This action of the tool portion 15 pressing the legs 206 also creates a tactile action of the tactile feedback mechanism(s), e.g., spring, although the user most likely does not feel the tactile since they are holding the battery housing. This action of the tool portion 15 pressing member(s) 100 may still provide an audible response though, which may provide a positive acknowledgement to the user that the battery is fully engaged in the tool housing. Thus, the tactile feedback mechanism 200 can be configured to provide a tactile feedback at release/de-latching and an audible "click" feedback at proper battery engagement (lock).

In some embodiments, the buckle spring 202 can self-restore to its pre-load shape shown in FIG. 3A when the spring mounting member 205 removes the de-latch application force (FIG. 3C) without requiring a return bias spring or force-return member.

Figure 8:
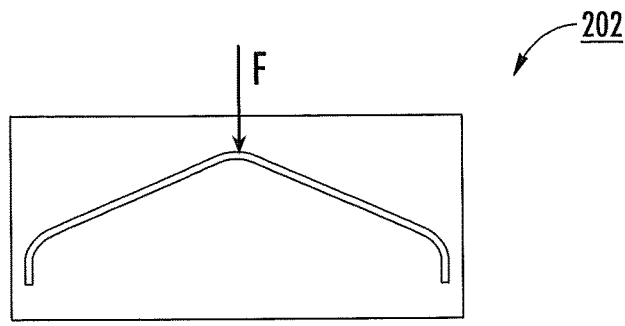
FIG. 8 illustrates an example of a shaped (to have a self-shape restoring biased stress) unloaded buckle spring according to some embodiments of the present invention.

FIG. 8 illustrates an example of a shaped pre-formed buckle spring 202 that may be particularly suitable to provide a "snap-action" tactile feedback according to embodiments of the present invention. This curvilinear spring buckle 202 can be attached to the spring mounting member 205 in a pre-load configuration to move the medial peak portion of the spring inward to be substantially straight/ and or in-line with the ends thereof as shown in FIGS. 3A and 4A. This shape can define biased stress to provide the self-restoring configuration noted above. However, other buckle spring shapes can be used to provide the desired tactile feedback. See e.g., U.S. Pat. Nos. 2,501,497, 3,366,756, and 5,268,545, the contents of which are hereby incorporated by reference as if recited in full herein.

Figure 6C:
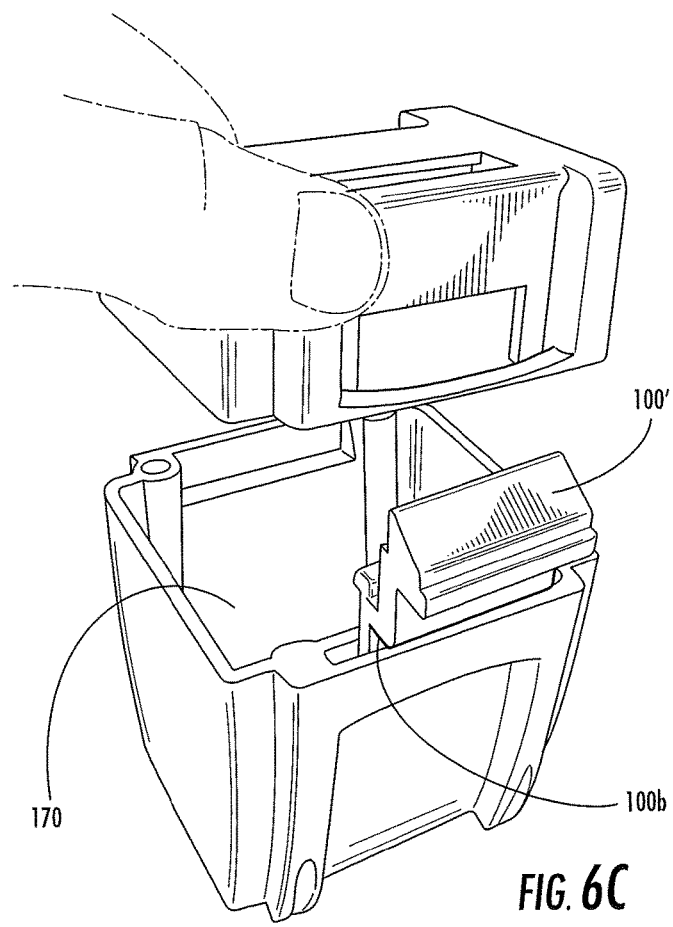
FIG. 6C illustrates the battery pack of FIG. 6A with a cell cavity and upper and lower housing components according to some embodiments of the present invention.
Figure 7:
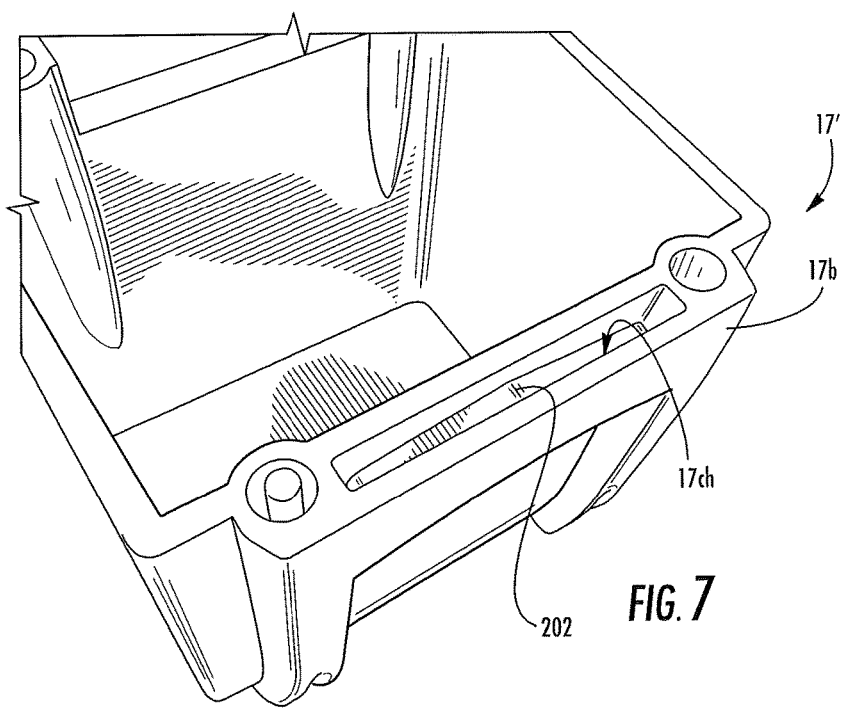
FIG. 7 is an enlarged top perspective view of the lower housing shown in FIG. 6C, without the release member, illustrating a tactile feedback member held under the release member according to embodiments of the present invention.

FIGS. 6A-6C illustrate that the battery pack 17' can include a single latch 105' and a single release member 100' as discussed above. FIG. 8 illustrates that the tactile feedback mechanism 200 can be provided using a buckle spring 202 that deflects in response to an application force applied by a bottom of the release member 100'. The lower body 17b of the battery pack 17 can include a channel 17ch that holds the buckle spring therein, under the release member 100'.

Figure 9A:
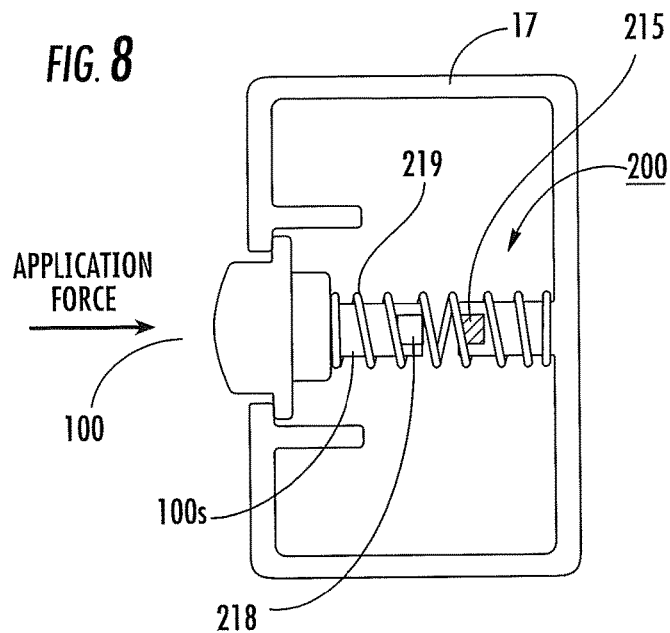
FIG. 9A is a schematic illustration of an alternate tactile feedback mechanism according to embodiments of the present invention.
Figure 9B:
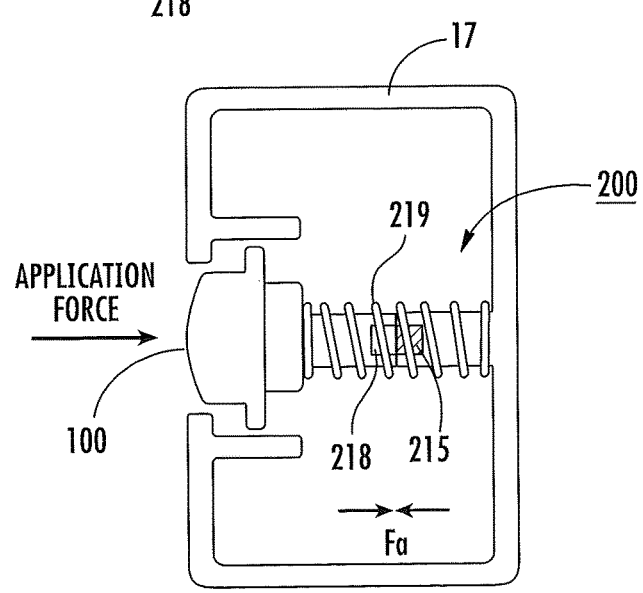
FIG. 9B is a schematic illustration of the tactile feedback mechanism shown in FIG. 9A with the release member depressed and the tactile feedback mechanism generating reduced application force according to embodiments of the present invention.

FIGS. 9A and 9B illustrate another embodiment of a tactile feedback mechanism 200. The tactile feedback mechanism 200 employs magnetic attraction to facilitate the tactile response. As shown, this assembly 200 includes at least one magnet 215, typically a permanent magnet such as a ferromagnetic (e.g., ferrite or rare earth) magnet along with another member 218 that generate a magnetic attraction force Fa (FIG. 9B) as the members 215, 218 move closer together or farther apart, or a material that moves or changes viscosity in response to exposure to a magnetic field. One of the members, e.g., member 218 can be a permanent or electromagnet or a member that comprises magnetorheological fluid (also known as an MR fluid, available from Lord Corporation) or a ferrofluid. The fluids change viscosity when subjected to a magnetic field. The at least one magnet 215 and/or 218 may also be an electromagnet, e.g., a wire coil that can conduct current. The current can be provided from a connection to the printed circuit board 188 (FIGS. 5A, 5B) to be powered by the battery in the battery pack 17.

In the embodiment shown, user depression of the release member 100 (or 100'), causes the magnet 215 and other cooperating member 218 to travel closer together. As shown in FIG. 9B, when the two members 215, 218 are in close proximity and/or contact, the attraction force Fa of the members 215, 218 reduces the application force and provides a tactile feedback similar to a "snap" action feel. The magnet 215 and other member 218 can be reversed. The release member 100 can include a stem 219 with a ledge that traps a coil spring 219 between that and the lower portion of the housing. The spring 219 can be used to help align the two members 215, 218 and increase the tactile feel to a user. Guide rails (not shown) may also be used to provide the desired travel path of the member 218 or 215. One or both members 215, 218 can be a permanent magnet 215 that can have any suitable configuration including a metallic disk, cylinder, block or other form factor. In addition, the magnet 215 and/or 218 can comprise a flexible magnet or a molded magnet.

Figure 4C:
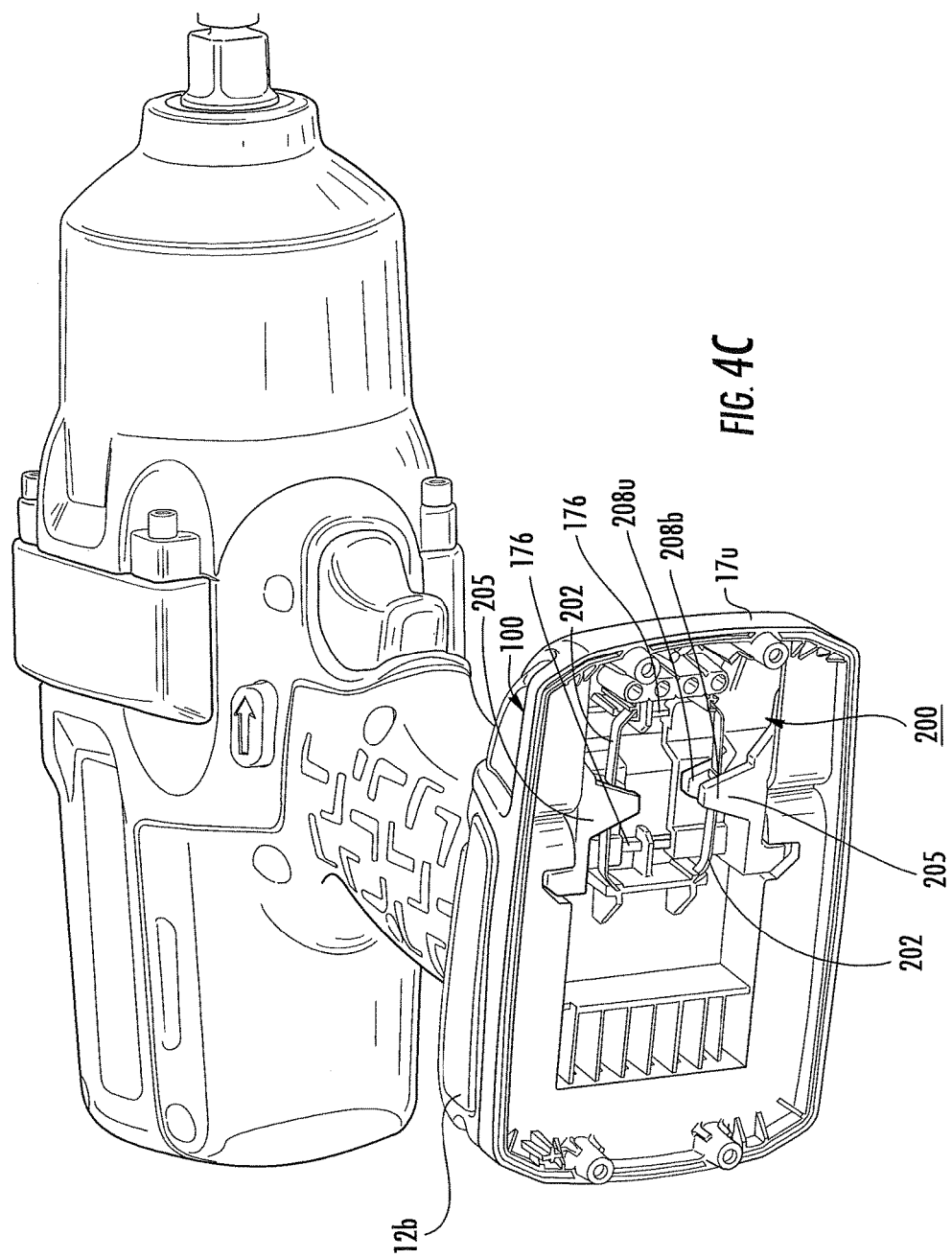
Figure 10A:
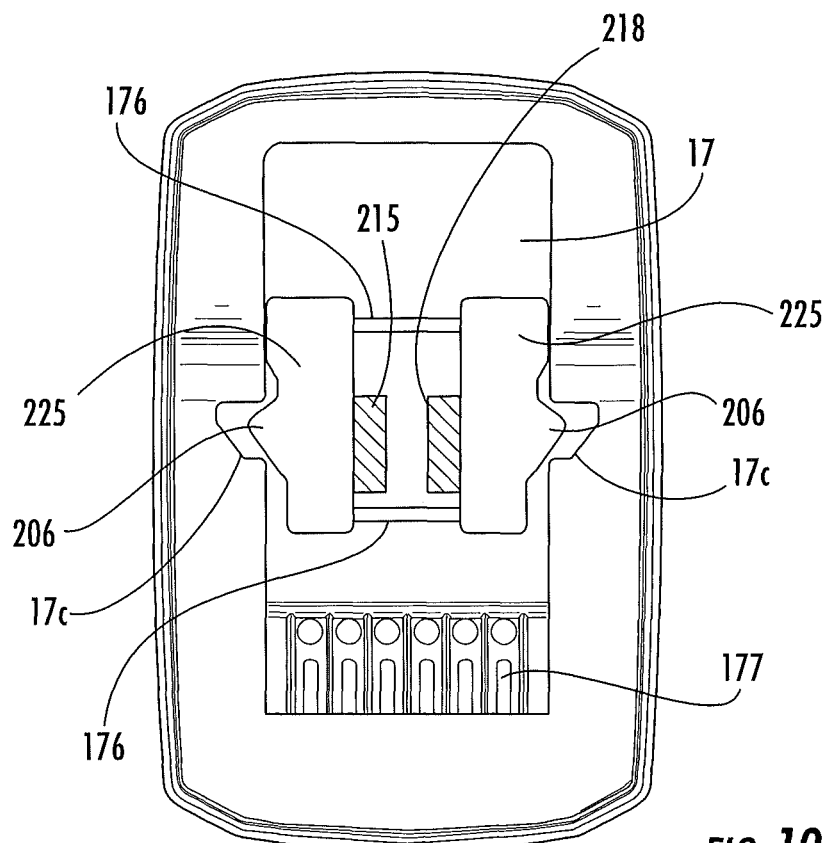
FIG. 10A is a bottom view of an upper portion of the battery pack with yet another exemplary tactile feedback mechanism.

FIG. 10A illustrates another embodiment of the tactile feedback mechanism 200 similar to the embodiments shown in FIGS. 4A-4C, but with the spring mounting members 205 replaced by holders 225 and the buckle spring 202 replaced by members 215, 218 (either or both of which can be a magnet, ferromagnetic material, or comprise a material that increases in viscosity when exposed to a magnetic field as discussed above).

Figure 10B:
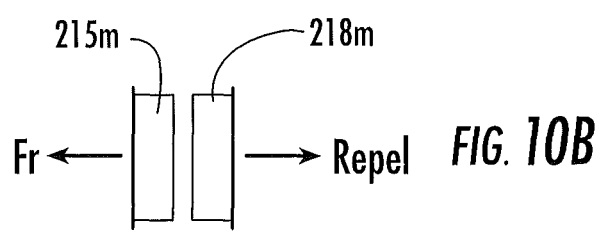
FIGS. 10B and 10C are schematic illustrations of different magnetic field configurations that may be used for the tactile feedback mechanism of FIG. 10A according to embodiments of the present invention.
Figure 10C:
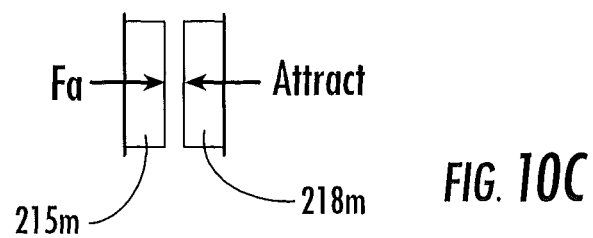

In some embodiments, each member 215, 218 comprises a permanent magnet 215m, 218m. FIG. 10B illustrates that the members 215m, 218m can be configured to repel each other when positioned close together, while FIG. 10C illustrates that the magnets 215, 218 can be configured to generate an attraction force as described above with respect to the embodiment shown in FIGS. 9A and 9B. In either case, the magnets 215m, 218m will provide a substantial change in force needed to move the release member 100 when the members 215, 218 are close together. In this embodiment, the members 215, 218 translate to be closer together. In other embodiments, the members 215, 218 can "snap" further apart when the application force overcomes the attraction force, to provide a reduced reaction force that generates the tactile feedback response (not shown).

Figure 11A:
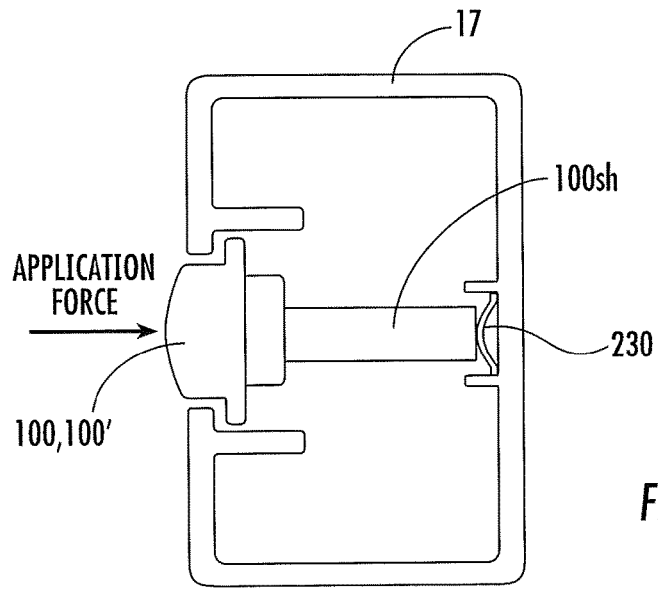
FIG. 11 is a schematic illustration of a battery pack with a snap dome tactile feedback mechanism according to yet other embodiments of the present invention.
FIG. 11B is a schematic illustration of a battery pack with a spring and a snap dome that allows for increased release member travel, relative to the embodiment shown in FIG. 11A, before snap dome activation, according to embodiments of the present invention.
Figure 11B:
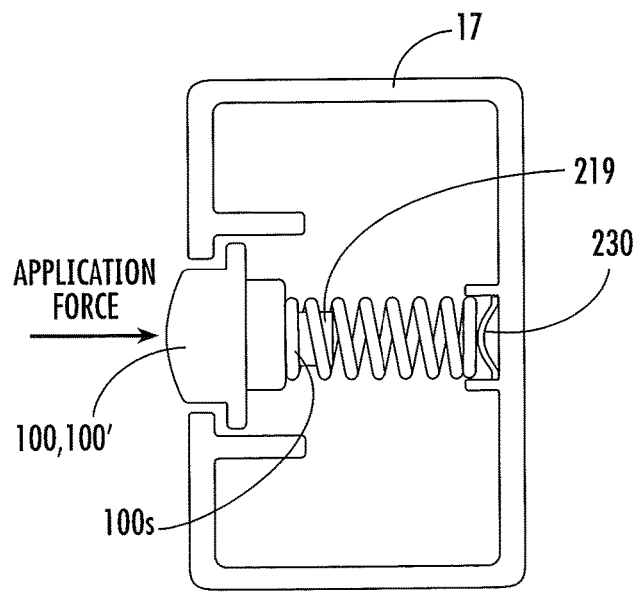
Figure 13:
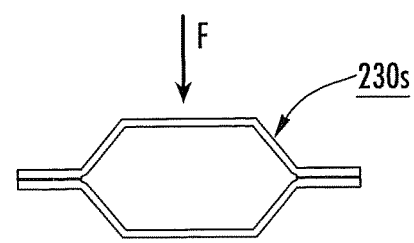
FIG. 13 is a schematic illustration of a stacked dome washer configuration used to provide tactile feedback to a user according to some embodiments of the present invention.

FIGS. 11A and 11B illustrate the release member 100, 100' cooperating with an resilient (spring) gasket and/or spring washer 230, such as a wave or dome spring disc washer or other shaped washer or gasket, such as an elastomeric (rubber) dome or shaped resilient washer or gasket to provide a returnable "snap" or click tactile response. The member 230 can be circular, square or have another shape that projects and deflects when force is applied (then returns to its shape when the force is removed). As shown in FIG. 13, the spring washer 230 can comprise one or a stack of spring gaskets or washers, such as a stack of spring dome washers, typically between about 2-10, and more typically 2-6 washers stacked together with some being in a reverse orientation. The spring washers can be metallic or elastomeric disc spring washers or gaskets or combinations of metallic and elastomeric gaskets or washers, such as Belleville dome spring washers, conical formed disc spring washers with cutouts, such as the Clover®-dome washer, rubber washers, extruded or molded elastomeric gaskets alone or integrated with metallic material, or other dome spring washer or resilient gasket types configured to provide a resilient "snap action" spring-like behavior.

FIG. 11A illustrates the use of a release member shaft 100sh that contacts the dome washer(s)/gasket 230 to generate the tactile response. FIG. 11B illustrates the use of a shorter step 100s and spring 219 that allows for an increase in button travel distance before the (dome) snap spring gasket or washer 230 deflects/actuates.

Figure 12A:
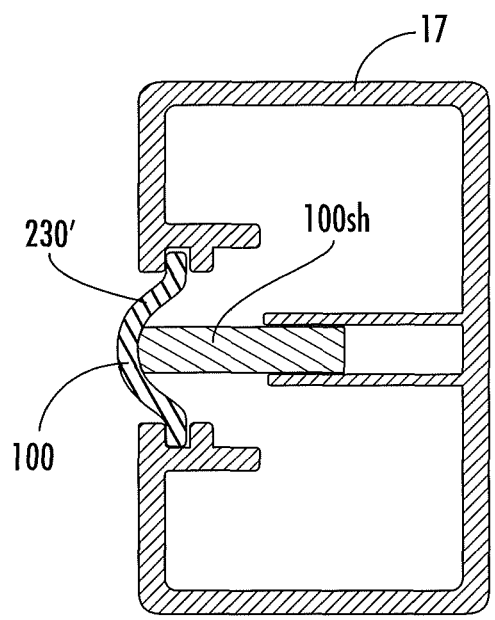
FIG. 12A is a schematic section view of an externally accessible dome gasket that can define part of or be the release member according to embodiments of the present invention.
Figure 12B:
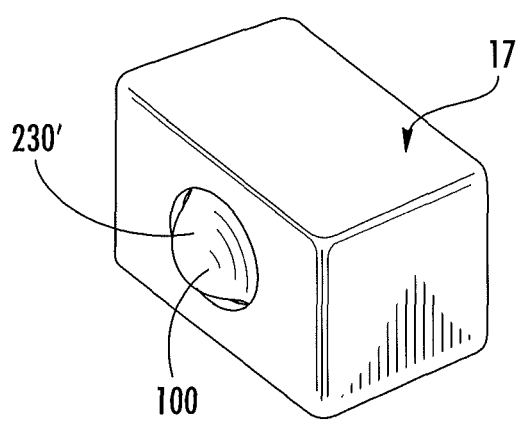
FIG. 12B is a side perspective view of a portion of a housing that includes the dome gasket according to embodiments of the present invention.
Figure 14:
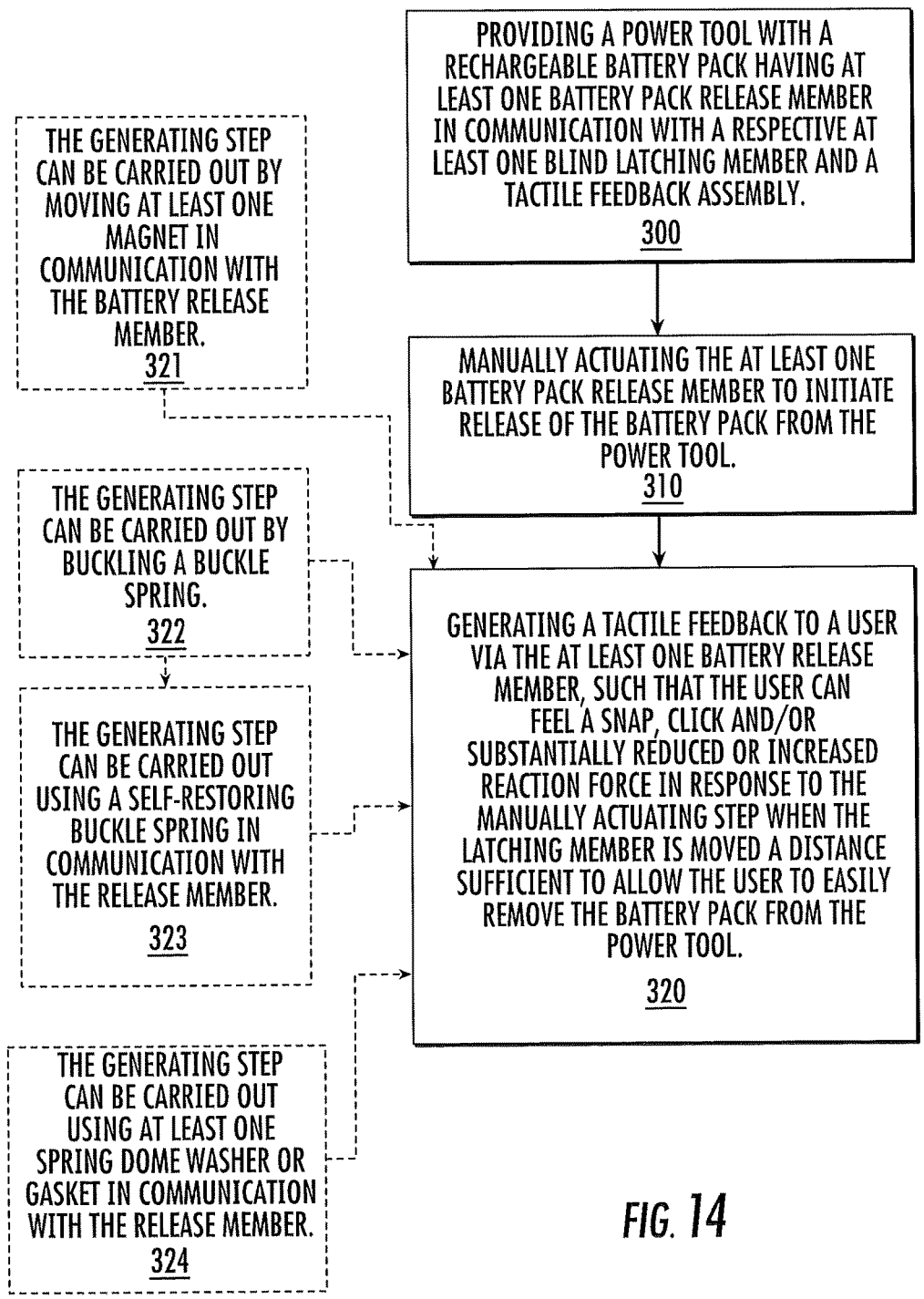
FIG. 14 is a flow chart of exemplary assembly steps that can be used to assemble a power tool according to embodiments of the present invention.

FIGS. 12A and 12B illustrate another embodiment of a resilient gasket 230' that deforms when depressed providing a "snap" action shape change when depressed (pushed inward) a sufficient amount, and that returns to its original shape to project outwardly (typically of its own accord after the Fa is removed). The resilient dome gasket can be described as a dome spring gasket. The gasket 230' can be attached to the battery pack 17, typically it is sealably attached to the battery pack 17, 17' so that it is externally accessible to a user. The resilient gasket 230' can be an elastomeric and/or rubber dome gasket that is held by a housing such as the battery pack 17. The resilient gasket 230' can also comprise a flexible metal or other material. The resilient gasket 230' can be overmolded onto the battery pack 17 based on a resilient material having sufficient structural rigidity. In other embodiments, the member 230' returns to its original shape on its own accord after the Fa is removed.

The gasket 230' can be and/or define part of the external release member 100, 100' that a user contacts to delatch the battery pack from the power tool or other device. The dome gasket 230' can have a circular perimeter as shown, or other geometric shape. As shown in FIG. 12A, the dome gasket 230' communicates with an underlying shaft 100sh that travels in a channel in the housing. Although not shown, underlying springs or other devices may be used to facilitate the tactile feel feedback and/or shape change (return). The gasket 230' is typically in communication with the delatch assembly so that the Fa and delatch/release position is correlated to the buckling/snap of the gasket 230'.

It is contemplated that other tactile feedback assemblies can be used to provide a suitable tactile response, such as a tactile "snap" or "click" feedback, such as a snap action coil spring, or a design similar to a writing implement such as a coil spring along with other components such as cams, including components that may rotate and click on one another. See, e.g., U.S. Pat. No. 6,340,261, entitled Ball-Point Pen, U.S. Pat. No. 6,435,751, entitled Click Type Writing Implement, and U.S. Pat. No. 4,968,168, entitled Ballpoint Pen with Clicking, the contents of which are hereby incorporated by reference as if recited in full herein. Another way the button can travel is by a cylinder inside another cylinder, similar to how the button of a click pen can travel inside the pen housing.

FIG. 13 is a flow chart of exemplary operations that can be carried out to release a battery pack from a tool. A power tool with a rechargeable battery pack having at least one battery pack release member (e.g., button) in communication with a respective at least one blind latching member, and a tactile feedback mechanism is provided (block 300). The at least one battery pack release member is manually actuated (e.g., depressed or pushed) to initiate release of the battery pack from the power tool (block 310). A tactile feedback to a user is generated via the at least one battery release, such that the user can tactilely feel a snap, click and/or substantially reduced reaction force in response to the manually actuating step when the latching member is moved a distance sufficient to allow the user to easily remove the battery pack from the power tool (block 320).

The tactile feedback generating step can be carried out by moving at least one magnet in communication with the battery release member (block 321). The generating step can be carried out by buckling a buckle spring (block 322). The generating step can be carried out using a self-restoring buckle spring in communication with the release member (block 323). The generating step can be carried out using at least one spring dome washer in communication with the release member (block 324).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, if used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A battery pack for a device, comprising:
a battery pack housing;
at least one externally accessible manually actuatable battery pack release member held by the battery pack housing, the battery pack release member having an actuation stroke distance from a home position to a fully deployed position;
a latch held by the battery pack housing in communication with or integral to the battery pack release member that releaseably locks the battery pack housing to the device; and
a tactile feedback mechanism that is held by the battery pack housing and is in communication with the battery pack release member or defines an externally accessible part of the battery pack release member, wherein the tactile feedback mechanism generates a sudden tactile feedback at a defined trigger point of the battery pack release member that is between the home and fully deployed position that abruptly changes an application force required by a user to manually actuate the at least one release member thereby indicating to the user the latch is in a prescribed position to allow the battery pack to now be easily removed from the device.

2. The battery pack of claim 1, wherein the sudden tactile feedback is an abruptly reduced resistance and/or reaction force at the defined trigger point, such that the abruptly reduced resistance or reaction force allows the user to apply an increased application force only up to the defined trigger point during actuation of the battery pack release member, at which time a reduced application force needed to actuate the battery pack release member in response to the abruptly reduced resistance or reaction force provides the sudden tactile feedback to the user that the battery pack can now be easily released from the device.

3. The battery pack of claim 1, wherein the device is a cordless power tool.

4. The battery pack of claim 3, wherein the at least one buckle spring is an elongate flat leaf spring that has a pre-formed shape that is curvilinear with a peak portion at a medial lengthwise location thereof before assembly, and wherein the at least one leaf spring is held in a pre-load configuration oriented to extend horizontally in the battery pack housing and buckles in response to a transversely applied force in response to the manual actuation of the at least one battery pack release member.

5. The battery pack of claim 1, wherein the tactile feedback mechanism includes at least one buckle spring.

6. The battery pack of claim 1, wherein the tactile feedback mechanism comprises at least one spring mount member held inside the battery pack housing that holds a buckle spring, the buckle spring having a length dimension and a width dimension, the length dimension associated with its long edges, the width dimension extending orthogonally between the long edges across its primary surfaces, wherein the at least one spring mount member holds the buckle spring with its long edges extending substantially horizontally and with its primary surfaces held substantially vertically, wherein the at least one spring mount member is configured to translate inwardly to deflect a medial portion of the buckling spring to generate the tactile feedback, and wherein the at least one buckle spring is a curvilinear flat leaf spring that is held in a pre-load configuration and that buckles in response to the manual actuation of the at least one battery pack release member, then returns to the pre-load configuration on its own accord when the battery pack release member returns to a home position.

7. The battery pack of claim 6, wherein the at least one spring mounting member has an outer locking leg that slidably translates inwardly a distance from a slot in an inner surface of the battery pack housing and at least one channel that slides along a liner rail formed in the battery pack inner surface.

8. The battery pack of claim 1, wherein the at least one battery pack release member comprises a monolithic unitary primary body with an upper portion and a lower portion, the upper portion residing outside the battery pack housing to define the externally accessible manually actuatable battery pack release member, the second portion residing inside the battery pack housing and defining a laterally inwardly translating portion of the tactile feedback mechanism.

9. The battery pack of claim 1, wherein the at least one battery pack release member includes first and second battery pack release members, wherein the tactile feedback mechanism includes first and second laterally spaced apart holding members inside the battery pack housing, one attached to a respective one of the battery pack release members, wherein the first and second holding members translate inwardly toward each other in response to the manual actuation of the first and second release members.

10. The battery pack of claim 9, wherein inward translation of the holding members move a buckle spring or move at least one magnet, MR fluid or ferrofluid material, to generate the tactile feedback.

11. The battery pack of claim 1, wherein the tactile feedback mechanism comprises at least one dome, metallic and/or elastomeric, spring washer or gasket in communication with the at least one release member.

12. The battery pack of claim 11, wherein the at least one dome spring washer or gasket comprises a plurality of stacked dome spring washers and/or gaskets.

13. The battery pack of claim 1, wherein the tactile feedback mechanism comprises at least one magnet, magnetorheological (MR) material or ferrofluid and uses a magnetic field to generate the tactile feedback.

14. The battery pack of claim 1, wherein the tactile feedback mechanism comprises first and second magnets, or a magnet and ferrofluid or MR fluid.

15. The battery pack of claim 14, wherein the at least one magnet is configured to move toward the other magnet to generate an attraction force that provides the tactile feedback.

16. The battery pack of claim 1, wherein the tactile feedback mechanism comprises first and second magnets, at least one of which travels toward or away from the other in response to actuation of the at least one release member to generate the tactile feedback.

17. A cordless power tool, comprising:
a power tool housing with a base; and
a battery pack with at least one blind latch that releasably engages the power tool, the battery pack also comprising:
at least one manually actuatable battery pack release member in communication with or that includes the at least one latch, the battery release member having a stroke distance between a home position and a fully deployed position; and
at least one tactile feedback mechanism in communication with the at least one battery pack release member that is held inside the battery pack or that defines part of the battery release member, wherein the tactile feedback mechanism generates a sudden tactile feedback to a user at a defined trigger point that is before the fully deployed position that abruptly reduces an application force required by a user to manually actuate the at least one release member, the tactile feedback transmitted through the at least one battery release member to the user, and wherein the tactile feedback is generated at the trigger point to indicate the at least one release member has been manually actuated by the user a sufficient distance to move the latch to a prescribed position that allows the user to easily remove the battery pack from the power tool.

18. The tool of claim 17, wherein the tactile feedback mechanism comprises at least one of the following that is communication with the at least one battery pack release member: a flat leaf buckle spring, a dome spring washer, a coil spring, a magnet, magnetorheological (MR) fluid or ferrofluid.

19. The tool of claim 17, wherein the tactile feedback mechanism comprises an elongate self shape-restoring buckle spring or a dome spring washer or gasket.

20. A method of releasing a rechargeable battery pack from a cordless power tool having at least one battery pack release member in communication with a respective at least one blind latching member, and a tactile feedback mechanism, comprising:
manually actuating the at least one battery pack release member to initiate release of the battery pack from the power tool; and
generating an abrupt reduction in resistance or reactance force to a user through the at least one battery pack release member in a delatching direction at a defined trigger point before a fully deployed position of the at least one battery pack release member thereby generating sudden tactile feedback to a user such that the user can feel a snap, click and/or substantially reduced reaction force, in response to the manually actuating step, when the latching member is moved a distance sufficient to allow the user to easily remove the battery pack from the power tool,
wherein the generating step can be carried out by at least one of the following: (i) moving at least one magnet in communication with the battery release member; (ii) buckling a buckle spring that may optionally be a self-restoring buckle spring in communication with the release member; (iii) applying force to at least one spring dome washer or gasket in communication with the release member; or (iv) pushing an externally accessible dome spring gasket inward, the dome spring gasket forming part of the battery release member.

* * * * *